US011080544B1

(12) United States Patent
Kim et al.

(10) Patent No.: US 11,080,544 B1
(45) Date of Patent: Aug. 3, 2021

(54) METHOD AND DEVICE FOR CALIBRATING PITCH OF CAMERA ON VEHICLE AND METHOD AND DEVICE FOR CONTINUAL LEARNING OF VANISHING POINT ESTIMATION MODEL TO BE USED FOR CALIBRATING THE PITCH

(71) Applicant: Stradvision, Inc., Pohang-si (KR)

(72) Inventors: Yongjoong Kim, Pohang-si (KR); Wooju Ryu, Pohang-si (KR); Bongnam Kang, Pohang-si (KR); Sung An Gweon, Seoul (KR)

(73) Assignee: Stradvision, Inc.

( * ) Notice: Subject to any disclaimer, the term of this patent is extended or adjusted under 35 U.S.C. 154(b) by 0 days.

(21) Appl. No.: 17/125,087

(22) Filed: Dec. 17, 2020

Related U.S. Application Data

(60) Provisional application No. 63/014,884, filed on Apr. 24, 2020.

(51) Int. Cl.

| | |
|---|---|
| ***G06K 9/32*** | (2006.01) |
| ***B60R 11/04*** | (2006.01) |
| ***G06T 7/80*** | (2017.01) |
| ***G06T 7/254*** | (2017.01) |

(52) U.S. Cl.
CPC ............ *G06K 9/3241* (2013.01); *B60R 11/04* (2013.01); *G06T 7/254* (2017.01); *G06T 7/80* (2017.01); *B60R 2300/30* (2013.01); *B60R 2300/804* (2013.01)

(58) Field of Classification Search
CPC . G06K 9/3241; B60R 11/04; B60R 2300/804; B60R 2300/30; G06T 7/80; G06T 7/254
See application file for complete search history.

(56) References Cited

U.S. PATENT DOCUMENTS

| | | | | |
|---|---|---|---|---|
| 2016/0353099 | A1* | 12/2016 | Thomson | G01C 21/206 |
| 2020/0074660 | A1* | 3/2020 | Oki | G06T 7/593 |
| 2020/0183411 | A1* | 6/2020 | Oba | B60W 30/165 |
| 2021/0018917 | A1* | 1/2021 | Levandowski | G06N 20/00 |

* cited by examiner

*Primary Examiner* — Nasim N Nirjhar
(74) *Attorney, Agent, or Firm* — McCarter & English, LLP

(57) ABSTRACT

A method for calibrating a pitch of a camera on a vehicle is provided. The method includes steps of: a calibration device (a) inputting driving images from the camera into an object detection network to detect objects and generate object detection information and into a lane detection network to detect lanes and generate lane detection information; (b) profiling the object and the lane detection information to generate object profiling information and lane profiling information, inputting the object profiling information into an object-based pitch estimation module to select a first target object and a second target object to generate a first pitch and a second pitch, and (iii) inputting vanishing point detection information and the lane profiling information into a lane-based pitch estimation module to generate a third pitch and a fourth pitch; and (c) inputting the first to the fourth pitches into a pitch-deciding module to generate a decided pitch.

18 Claims, 12 Drawing Sheets

$$\therefore z = \frac{L}{\tan(\phi + \theta)} \quad (\phi = tan^{-1}\frac{y - c_y}{f})$$

$$X = \frac{x - c_x}{f} Z \qquad H = \frac{Z' - Z}{Z'} L$$

BOUNDING BOX WIDTH : $f$ = REAL WIDTH : Z $$Z = \frac{f * REAL\ WIDTH}{BOUNDUNG\ BOX\ WIDTH}$$

$$\therefore z = \frac{L}{\tan(\phi + \theta)} \quad \left(\phi = \tan^{-1}\frac{y - c_y}{f}\right)$$

$$X = \frac{x - c_x}{f} Z \qquad H = \frac{Z' - Z}{Z'} L$$

METHOD AND DEVICE FOR CALIBRATING PITCH OF CAMERA ON VEHICLE AND METHOD AND DEVICE FOR CONTINUAL LEARNING OF VANISHING POINT ESTIMATION MODEL TO BE USED FOR CALIBRATING THE PITCH

CROSS REFERENCE TO RELATED APPLICATION

This application claims the benefit of priority to U.S. Provisional Patent Application No. 63/014,884, filed on Apr. 24, 2020, the entire contents of which being incorporated herein by reference.

FIELD OF THE DISCLOSURE

The present disclosure relates to a method and a device for calibrating a pitch of a camera on a vehicle by using a vanishing point, objects, and lane information, and a method and a device for continual learning of a vanishing point estimation model to be used for calibrating the pitch.

BACKGROUND OF THE DISCLOSURE

Today's vehicles are combined with IT technology to provide various functions. In order to enhance a driving stability of a vehicle and to improve convenience of users, various types of an advanced driver-assistance system (ADAS) are being developed.

Herein, the ADAS performs functions of adaptive headlight, front collision avoidance, lane departure prevention, blind spot monitoring, improved rear monitoring, etc. by using advanced sensing devices and intelligent imaging devices.

Based on a perception model, the ADAS as such analyzes driving images transmitted from a video image detection device such as a camera, a LiDAR sensor, a radar sensor, etc., to thereby detect information on a surrounding environment of the vehicle.

And, when analyzing such a driving image, a distance between an object in the driving image and the vehicle must be measured, and for this purpose, a pitch of the camera is calculated, and then the distance of the object from the vehicle in an actual driving environment is estimated by using the calculated pitch.

Meanwhile, during driving operation of the vehicle, rolling of the vehicle occurs due to grooves on a road surface, and accordingly, the pitch of the camera fixed to the vehicle changes, so it must be accurately estimated.

And, in order to estimate the pitch of the camera, conventionally, a vanishing point in the driving image is used or an ego-motion, that is, the motion of the camera, is used.

The method adopting the vanishing point of the driving image estimates the pitch by detecting the vanishing point in the driving image and calculating an angle between the vanishing point and a center point of the driving image at the origin of the camera. This has an advantage of fully automated pitch estimation without a need for another point to estimate the pitch, however, detection of the vanishing point in the driving image may be difficult depending on the driving environment, and accordingly, an accuracy of the pitch estimation may deteriorate.

And, the method adopting the ego-motion estimates the pitch by calculating the movement of the object in each frame using previous and next frames of the driving image. This has an advantage of a better accuracy compared to the method adopting the vanishing points, however, it requires more computational power than the method adopting the vanishing point since it needs to analyze the previous and next frames, and in addition, an unstable feature or an irregular illumination change due to the driving environment hampers accurate detection of the motion.

SUMMARY OF THE DISCLOSURE

It is an object of the present disclosure to solve all the aforementioned problems.

It is another object of the present disclosure to accurately estimate a pitch of a camera on a vehicle compared to conventional methods.

It is still another object of the present disclosure to estimate the pitch of the camera on the vehicle with less computational load compared to the conventional methods.

It is still yet another object of the present disclosure to perform continual learning of a vanishing point estimation model to be used for detecting at least one vanishing point.

In accordance with one aspect of the present disclosure, there is provided a method for calibrating at least one pitch of at least one camera on a specific vehicle, including steps of: (a) if at least one driving image is acquired from the camera during driving operation of the specific vehicle, a calibration device performing or supporting another device to perform a process of inputting the driving image respectively into an object detection network and a lane detection network, to thereby allow (i) the object detection network to detect one or more objects on the driving image and thus to generate object detection information on the objects, and (ii) the lane detection network to detect one or more lanes on the driving image and thus to generate lane detection information on the lanes; (b) the calibration device performing or supporting another device to perform (i) a process of profiling the object detection information to thereby generate each piece of object profiling information corresponding to each of the objects and a process of profiling the lane detection information to thereby generate each piece of lane profiling information corresponding to each of the lanes, (ii) a process of inputting the object profiling information into an object-based pitch estimation module to allow the object-based pitch estimation module to (ii-1) select a first target object among the objects by referring to the object profiling information and execute a first pitch estimation using a first height of the first target object, to thereby generate a first pitch and (ii-2) select a second target object among the objects by referring to the object profiling information and execute a second pitch estimation using a width of the second target object, to thereby generate a second pitch, and (iii) a process of inputting vanishing point detection information and the lane profiling information into a lane-based pitch estimation module, wherein the vanishing point detection information is generated by a VP (vanishing point) estimation network capable of analyzing the driving image and thus detecting at least one vanishing point, to thereby allow the lane-based pitch estimation module to (iii-1) execute a third pitch estimation using the lane profiling information and thus generate a third pitch and (iii-2) execute a fourth pitch estimation using the vanishing point detection information and thus generate a fourth pitch; and (c) the calibration device performing or supporting another device to perform a process of inputting the first pitch to the fourth pitch into a pitch-deciding module, to thereby allow the pitch-deciding module to apply ensemble operation to the first pitch to the fourth pitch and thus to generate a decided pitch corresponding to the driving image.

As one example, at the step of (c), the calibration device performs or supports another device to perform a process of instructing the pitch-deciding module to (i) select a third target object among the objects by referring to the object profiling information, (ii) calculate a second height of the third target object by using the third pitch, (iii) validate the third pitch by confirming whether the second height is within a height range, (iv) (iv-1) if the third pitch is determined as valid, output the third pitch as the decided pitch, and (iv-2) if the third pitch is determined as invalid, compare the first target object corresponding to the first pitch and the second target object corresponding to the second pitch, and (iv-2-a) if the first target object and the second target object are determined as identical, output one of the first pitch and the second pitch as the decided pitch and (iv-2-b) if the first target object and the second target object are determined as not identical, output a specific pitch as the decided pitch, wherein the specific pitch corresponds to a specific target object, whose lateral distance from the specific vehicle is smaller than that of a remaining target object, among the first target object and the second target object, and (v) if none of the objects and the lanes are detected from the driving image, output the fourth pitch as the decided pitch.

As one example, the calibration device performs or supports another device to perform a process of instructing the pitch-deciding module to select a first specific object, whose lateral distance is smallest, as the third target object and wherein the first specific object is selected among first candidate objects (1) whose lateral distances from the specific vehicle are equal to or less than a first distance threshold, (2) whose bounding boxes are not truncated, (3) whose object classes are a vehicle class, and (4) which are not occluded.

As one example, at the step of (c), the calibration device performs or supports another device to perform a process of instructing the pitch-deciding module to apply smoothing operation to the decided pitch using its previous pitch in a previous frame, to thereby execute pitch smoothing of the decided pitch and execute tolerance handling which limits a maximal change in the decided pitch from its previous pitch using a pitch change threshold.

As one example, the method further includes a step of: (d) the calibration device performing or supporting another device to perform a process of calculating one or more pitch losses by referring to the decided pitch and the fourth pitch and a process of on-vehicle continual learning of the VP estimation network by using the pitch losses.

As one example, the calibration device performs or supports another device to perform (i) during the driving operation of the specific vehicle, a process of fast-adapting by instance-wise incremental learning of the VP estimation network using the pitch losses and (ii) after completion of the driving operation of the specific vehicle, a process of balanced continual learning of the VP estimation network using sampled data sampled during the driving operation, to thereby recover from catastrophic forgetting due to the process of fast-adapting.

As one example, the calibration device performs or supports another device to perform (i) during the driving operation of the specific vehicle, a process of fast-adapting by instance-wise incremental learning of the VP estimation network using the pitch losses, (ii) a process of transmitting the sampled data, used during the instance-wise incremental learning, to a learning server, to thereby allow the learning server to (ii-1) execute server-side continual learning of a reference VP estimation network, corresponding to the VP estimation network, by using the sampled data and (ii-2) transmit one or more parameters, updated through the server-side continual learning, to the calibration device, and (iii) after completion of the driving operation of the specific vehicle, a process of updating the VP estimation network by using the parameters received from the learning server.

As one example, the method further includes a step of: (e) the calibration device performing or supporting another device to perform (i) a process of transmitting a trained VP estimation network model, created by the on-vehicle continual learning, to a learning server, to thereby allow the learning server to (i-1) evaluate the trained VP estimation network model and at least one another trained VP estimation network model received from at least one another vehicle and thus (i-2) select a best VP estimation network model and transmit the best VP estimation network model to the calibration device and (ii) a process of updating the VP estimation network by using the best VP estimation network model received from the learning server.

As one example, at the step of (b), the calibration device performs or supports another device to perform a process of instructing the object-based pitch estimation module to (i) select a second specific object, whose lateral distance is smallest, as the first target object, wherein the second specific object is selected among second candidate objects (1) whose lateral distances from the specific vehicle are equal to or less than a second distance threshold, (2) whose bounding boxes are not truncated, (3) whose object classes are a vehicle class, and (4) which are not occluded, by referring to the object profiling information, (ii) acquire an average height of the first target object by referring to detection history of the first target object, and (iii) (iii-1) if the average height is equal to or greater than a minimum height threshold and equal to or less than a maximum height threshold, then determine the average height as the first height and (iii-2) if the average height is less than the minimum height threshold or greater than the maximum height threshold, then determine an average of the minimum height threshold and the maximum height threshold as the first height.

As one example, at the step of (b), the calibration device performs or supports another device to perform a process of instructing the object-based pitch estimation module to select a third specific object, whose lateral distance is smallest, as the second target object, wherein the third specific object is selected among third candidate objects (1) whose lateral distances from the specific vehicle are equal to or less than a third distance threshold, (2) whose bounding boxes are not truncated, (3) whose object classes are a vehicle class, (4) which are not occluded, (5) whose differences between 2D bounding boxes and 3D bounding boxes among the bounding boxes thereof are equal to or less than a box difference threshold, and (6) whose aspect ratios of the bounding boxes thereof are equal to or greater than a ratio threshold, by referring to the object profiling information.

As one example, at the step of (b), the calibration device performs or supports another device to perform a process of allowing the lane-based estimation module to (i) select a first lane and a second lane, (1) whose lengths are equal to or greater than a length threshold, (2) which are straight, and (3) which are parallel to each other on a coordinate system of the specific vehicle, by referring to the lane profiling information, (ii) detect a target vanishing point by using the first lane and the second lane, and (iii) execute the third pitch estimation by using the target vanishing point.

In accordance with another aspect of the present disclosure, there is provided a calibration device for calibrating at least one pitch of at least one camera on a specific vehicle, including: at least one memory that stores instructions; and at least one processor configured to execute the instructions to perform or support another device to perform: (I) if at least one driving image is acquired from the camera during driving operation of the specific vehicle, a process of inputting the driving image respectively into an object detection network and a lane detection network, to thereby allow (i) the object detection network to detect one or more objects on the driving image and thus to generate object detection information on the objects, and (ii) the lane detection network to detect one or more lanes on the driving image and thus to generate lane detection information on the lanes, (II) (i) a process of profiling the object detection information to thereby generate each piece of object profiling information corresponding to each of the objects and a process of profiling the lane detection information to thereby generate each piece of lane profiling information corresponding to each of the lanes, (ii) a process of inputting the object profiling information into an object-based pitch estimation module to allow the object-based pitch estimation module to (ii-1) select a first target object among the objects by referring to the object profiling information and execute a first pitch estimation using a first height of the first target object, to thereby generate a first pitch and (ii-2) select a second target object among the objects by referring to the object profiling information and execute a second pitch estimation using a width of the second target object, to thereby generate a second pitch, and (iii) a process of inputting vanishing point detection information and the lane profiling information into a lane-based pitch estimation module, wherein the vanishing point detection information is generated by a VP (vanishing point) estimation network capable of analyzing the driving image and thus detecting at least one vanishing point, to thereby allow the lane-based pitch estimation module to (iii-1) execute a third pitch estimation using the lane profiling information and thus generate a third pitch and (iii-2) execute a fourth pitch estimation using the vanishing point detection information and thus generate a fourth pitch, and (III) a process of inputting the first pitch to the fourth pitch into a pitch-deciding module, to thereby allow the pitch-deciding module to apply ensemble operation to the first pitch to the fourth pitch and thus to generate a decided pitch corresponding to the driving image.

As one example, at the process of (III), the processor performs or supports another device to perform a process of instructing the pitch-deciding module to (i) select a third target object among the objects by referring to the object profiling information, (ii) calculate a second height of the third target object by using the third pitch, (iii) validate the third pitch by confirming whether the second height is within a height range, (iv) (iv-1) if the third pitch is determined as valid, output the third pitch as the decided pitch, and (iv-2) if the third pitch is determined as invalid, compare the first target object corresponding to the first pitch and the second target object corresponding to the second pitch, and (iv-2-a) if the first target object and the second target object are determined as identical, output one of the first pitch and the second pitch as the decided pitch and (iv-2-b) if the first target object and the second target object are determined as not identical, output a specific pitch as the decided pitch, wherein the specific pitch corresponds to a specific target object, whose lateral distance from the specific vehicle is smaller than that of a remaining target object, among the first target object and the second target object, and (v) if none of the objects and the lanes are detected from the driving image, output the fourth pitch as the decided pitch.

As one example, the processor performs or supports another device to perform a process of instructing the pitch-deciding module to select a first specific object, whose lateral distance is smallest, as the third target object and wherein the first specific object is selected among first candidate objects (1) whose lateral distances from the specific vehicle are equal to or less than a first distance threshold, (2) whose bounding boxes are not truncated, (3) whose object classes are a vehicle class, and (4) which are not occluded.

As one example, at the process of (III), the processor performs or supports another device to perform a process of instructing the pitch-deciding module to apply smoothing operation to the decided pitch using its previous pitch in a previous frame, to thereby execute pitch smoothing of the decided pitch and execute tolerance handling which limits a maximal change in the decided pitch from its previous pitch using a pitch change threshold.

As one example, the processor further performs: (IV) a process of calculating one or more pitch losses by referring to the decided pitch and the fourth pitch and a process of on-vehicle continual learning of the VP estimation network by using the pitch losses.

As one example, the processor performs or supports another device to perform (i) during the driving operation of the specific vehicle, a process of fast-adapting by instance-wise incremental learning of the VP estimation network using the pitch losses and (ii) after completion of the driving operation of the specific vehicle, a process of balanced continual learning of the VP estimation network using sampled data sampled during the driving operation, to thereby recover from catastrophic forgetting due to the process of fast-adapting.

As one example, the processor performs or supports another device to perform (i) during the driving operation of the specific vehicle, a process of fast-adapting by instance-wise incremental learning of the VP estimation network using the pitch losses, (ii) a process of transmitting the sampled data, used during the instance-wise incremental learning, to a learning server, to thereby allow the learning server to (ii-1) execute server-side continual learning of a reference VP estimation network, corresponding to the VP estimation network, by using the sampled data and (ii-2) transmit one or more parameters, updated through the server-side continual learning, to the calibration device, and (iii) after completion of the driving operation of the specific vehicle, a process of updating the VP estimation network by using the parameters received from the learning server.

As one example, the processor further performs: (V) (i) a process of transmitting a trained VP estimation network model, created by the on-vehicle continual learning, to a learning server, to thereby allow the learning server to (i-1) evaluate the trained VP estimation network model and at least one another trained VP estimation network model received from at least one another vehicle and thus (i-2) select a best VP estimation network model and transmit the best VP estimation network model to the calibration device and (ii) a process of updating the VP estimation network by using the best VP estimation network model received from the learning server.

As one example, at the process of (II), the processor performs or supports another device to perform a process of instructing the object-based pitch estimation module to (i) select a second specific object, whose lateral distance is smallest, as the first target object, wherein the second specific object is selected among second candidate objects (1) whose lateral distances from the specific vehicle are equal to or less than a second distance threshold, (2) whose bounding boxes are not truncated, (3) whose object classes are a vehicle class, and (4) which are not occluded, by referring to the object profiling information, (ii) acquire an average height of the first target object by referring to detection history of the first target object, and (iii) (iii-1) if the average height is equal to or greater than a minimum height threshold and equal to or less than a maximum height threshold, then determine the average height as the first height and (iii-2) if the average height is less than the minimum height threshold or greater than the maximum height threshold, then determine an average of the minimum height threshold and the maximum height threshold as the first height.

As one example, at the process of (II), the processor performs or supports another device to perform a process of instructing the object-based pitch estimation module to select a third specific object, whose lateral distance is smallest, as the second target object, wherein the third specific object is selected among third candidate objects (1) whose lateral distances from the specific vehicle are equal to or less than a third distance threshold, (2) whose bounding boxes are not truncated, (3) whose object classes are a vehicle class, (4) which are not occluded, (5) whose differences between 2D bounding boxes and 3D bounding boxes among the bounding boxes thereof are equal to or less than a box difference threshold, and (6) whose aspect ratios of the bounding boxes thereof are equal to or greater than a ratio threshold, by referring to the object profiling information.

As one example, at the process of (II), the processor performs or supports another device to perform a process of allowing the lane-based estimation module to (i) select a first lane and a second lane, (1) whose lengths are equal to or greater than a length threshold, (2) which are straight, and (3) which are parallel to each other on a coordinate system of the specific vehicle, by referring to the lane profiling information, (ii) detect a target vanishing point by using the first lane and the second lane, and (iii) execute the third pitch estimation by using the target vanishing point.

In addition, recordable media readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings, in which.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
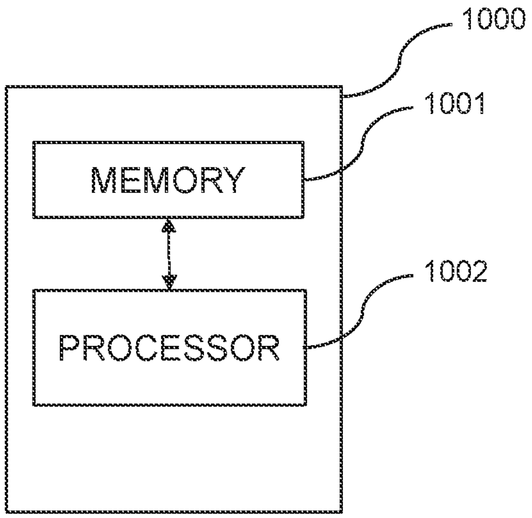
FIG. 1 is a drawing schematically illustrating a calibration device for calibrating at least one pitch of at least one camera on a specific vehicle, e.g., an ego-vehicle, in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

As used in this specification and the appended claims, the singular forms "a," "an," and "the" include plural referents unless the content and context clearly dictates otherwise.

The headings and abstract of the present disclosure provided herein are for convenience only and do not limit or interpret the scope or meaning of the embodiments.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

To allow those skilled in the art to carry out the present disclosure easily, the example embodiments of the present disclosure by referring to attached diagrams will be explained in detail as shown below.

FIG. 1 is a drawing schematically illustrating a calibration device for calibrating at least one pitch of at least one camera on a specific vehicle, i.e., an ego-vehicle, in accordance with one example embodiment of the present disclosure. By referring to FIG. 1, the calibration device 1000 may include a memory 1001 to store instructions to estimate the pitch of the camera by using object detection information and lane detection information on at least one driving image acquired from the camera on the specific vehicle, and a processor 1002 for performing processes to estimate the pitch of the camera on the specific vehicle according to the instructions stored in the memory 1001.

Specifically, the calibration device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include software configuration of OS and applications that achieve specific purposes.

However, such description of the computing device does not exclude an integrated device including any combination of a processor, a memory, a medium, or any other computing components for implementing the present disclosure.

Figure 2:
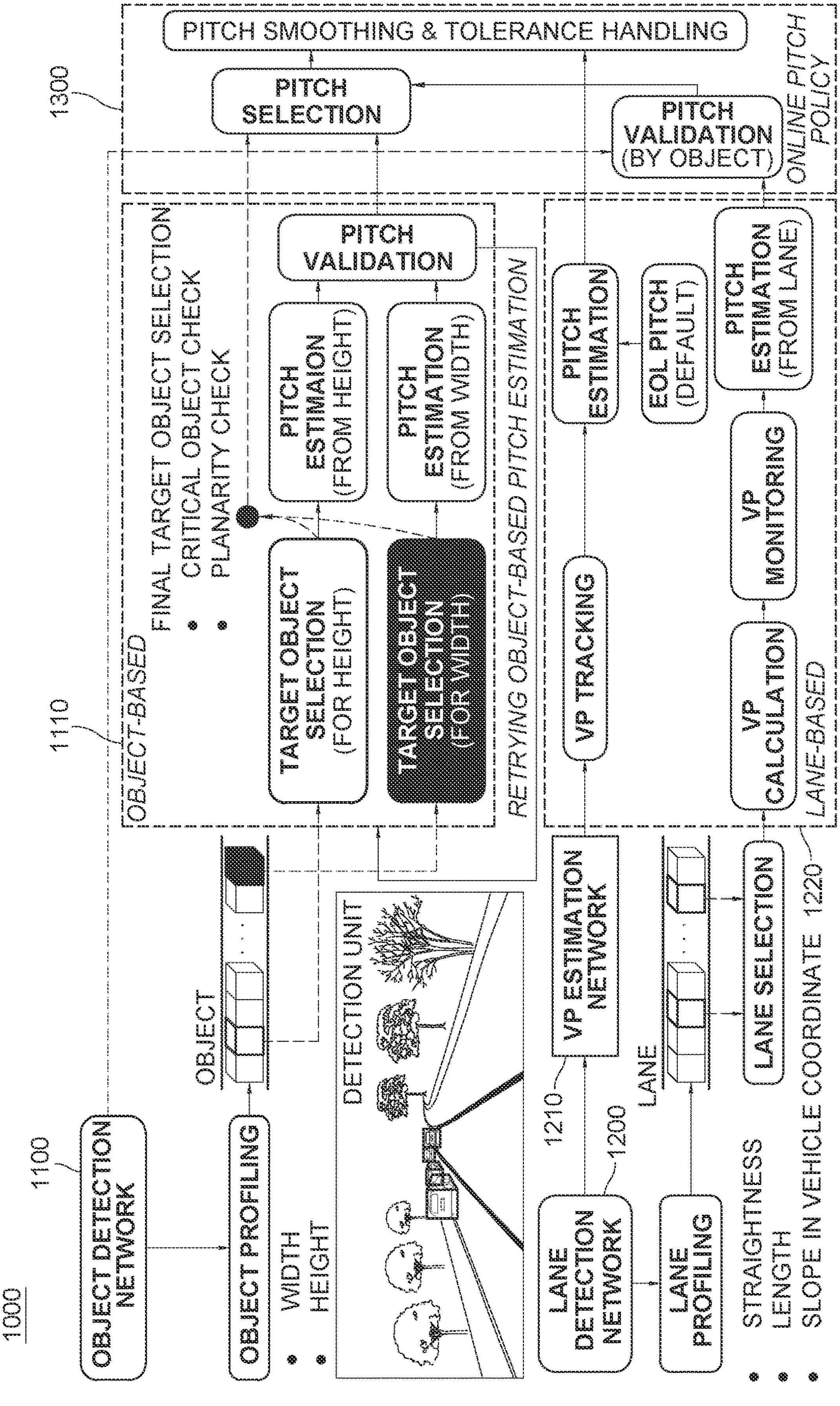
FIG. 2 is a drawing schematically illustrating a method for calibrating the pitch of the camera on the specific vehicle in accordance with one example embodiment of the present disclosure.

A method for calibrating the pitch of the camera on the specific vehicle by using the calibration device 1000 in accordance with one example embodiment of the present disclosure is described by referring to FIG. 2 as follows.

First, if the driving image is acquired from the camera during driving operation of the specific vehicle, for example, an autonomous vehicle, then the calibration device 1000 may perform or support another device to perform a process of inputting the driving image respectively into an object detection network 1100 and a lane detection network 1200, to thereby allow (i) the object detection network 1100 to detect one or more objects on the driving image and thus to generate the object detection information on the objects, and (ii) the lane detection network 1200 to detect one or more lanes on the driving image and thus to generate the lane detection information on the lanes.

Herein, the object detection network 1100 may be implemented as a classifier based on visual features & shallow learning, or as an object detection network based on a CNN (convolutional neural network) which uses deep learning, but the scope of the present disclosure is not limited thereto, and any algorithm capable of detecting the objects from the driving image may be used. Also, outputs of the object detection network 1100 may include (1) object region information such as 2D bounding boxes or 3D bounding boxes and (2) object class information on classes of each of the objects corresponding to each of the bounding boxes, however, the scope of the present disclosure is not limited thereto, and the outputs may include various information related to the objects, for example, information on types of vehicles such as sedans, trucks, SUVs.

Also, the lane detection network 1200 may be implemented as an image processing & computer vision algorithm or a lane detection network based on the CNN which uses the deep learning, but the scope of the present disclosure is not limited thereto, and any algorithm capable of detecting the lanes from the driving image may be used. Also, an output of the lane detection network 1200 may be a lane model represented by an n-th order polynomial equation.

Next, the calibration device 1000 may perform or support another device to perform (i) a process of profiling the object detection information to thereby generate each piece of object profiling information corresponding to each of the objects and (ii) a process of profiling the lane detection information to thereby generate each piece of lane profiling information corresponding to each of the lanes.

Herein, the object profiling information may include each of heights and each of widths of each of the objects, but the scope of the present disclosure is not limited thereto, and may include various information on each of the objects.

Also, the lane profiling information may include each of straightnesses, each of lengths, and each of slopes in a vehicle coordinate system of each of the lanes, but the scope of the present disclosure is not limited thereto, and may include various information on each of the lanes.

Next, the calibration device 1000 may input the driving image or the lane detection information into a VP (vanishing point) estimation network 1210, to thereby allow the VP estimation network 1210 to apply at least one learning operation to the driving image or the lane detection information and thus to detect at least one vanishing point in the driving image and to track the vanishing point.

Next, the calibration device may perform or support another device to perform a process of inputting the object profiling information into an object-based pitch estimation module 1110, to allow the object-based pitch estimation module 1110 to (1) select a first target object among the objects by referring to the object profiling information and execute a first pitch estimation using a first height of the first target object, to thereby generate a first pitch and (2) select a second target object among the objects by referring to the object profiling information and execute a second pitch estimation using a width of the second target object, to thereby generate a second pitch.

Also, the calibration device 1000 may perform or support another device to perform a process of inputting (1) vanishing point detection information generated by the VP estimation network 1210 and (2) the lane profiling information into a lane-based pitch estimation module 1220, to thereby allow the lane-based pitch estimation module 1220 to (1) execute a third pitch estimation using the lane profiling information and thus generate a third pitch and (2) execute a fourth pitch estimation using the vanishing point detection information and thus generate a fourth pitch. Herein, the VP estimation network 1210 may analyze the driving image or the lane detection information and thus detect the vanishing point, and also, the vanishing point detection information may be information on the detected vanishing point.

Processes of generating the first pitch and the second pitch by the object-based pitch estimation module 1110 and processes of generating the third pitch and the fourth pitch by the lane-based pitch estimation module 1220 are described as follows.

First, the object-based pitch estimation module 1110 may (i) select second candidate objects among the objects detected in the driving image by referring to one of preset conditions which will be explained below and (ii) select a second specific object, whose lateral distance is smallest among the second candidate objects, as the first target object by referring to the object profiling information. Herein, the preset conditions may be criteria for finding the second candidate objects (1) having lateral distances from the specific vehicle equal to or less than a second distance threshold, (2) having bounding boxes that are not truncated, (3) having object classes that are a vehicle class, and (4) being not occluded.

Herein, each of the lateral distances may be each of distances between each of the objects and the specific vehicle in a direction perpendicular to a widthwise direction of the specific vehicle, but the scope of the present disclosure is not limited thereto, and any lateral distance suitable for easy recognition of the objects may be set as the second distance threshold. For example, the second distance threshold may be 10 meters. Meanwhile, objects whose bounding boxes are not truncated may be objects whose bounding boxes are not intersecting a boundary of the driving image. As other examples, the objects having the vehicle class may be objects classified by an object detector as having classes corresponding to the types of the vehicles such as the sedans, SUVs, trucks, buses, etc. And the objects not occluded may be objects whose bounding boxes intersect none of bounding boxes of other objects, or may be objects whose bottom coordinates of their bounding boxes are closer to a bottom of the driving image if their bounding boxes intersect at least part of the bounding boxes of said other objects.

Then, the object-based pitch estimation module 1100 may (i) acquire an average height of the first target object by referring to detection history of the first target object and (ii) (ii-1) if the average height is equal to or greater than a minimum height threshold and equal to or less than a maximum height threshold, then may determine the average height as the first height and (ii-2) if the average height is less than the minimum height threshold or greater than the maximum height threshold, then may determine an average of the minimum height threshold and the maximum height threshold as the first height.

Herein, the minimum height threshold and the maximum height threshold may be set for each of the types of the vehicles. As one example, the minimum height threshold may be set as 1.4 m and the maximum height threshold may be set as 1.8 m for the sedans and SUVs or vehicles of similar sizes while the minimum height threshold may be set as 2.5 m and the maximum height threshold may be set as 4 m for the buses and trucks or vehicles of similar sizes.

And, the object-based pitch estimation module 1100 may generate the first pitch by using the binary search or by direct calculation, from the first height of the first target object.

That is, through the binary search, the object-based pitch estimation module 1100 may receive (i) a current pitch angle P, (ii) a pitch search range a in degrees, (iii) a bounding box B of the first target object, and (iv) the first height H of the first target object as its inputs, and may output a new estimated pitch angle P'.

Herein, supposing that a min_angle is P-α, a max_angle is P+α, and that a function for calculating the height of the bounding box B of the first target object in the vehicle coordinates is VCS_H(B), then on condition that VCS_H(B)!=H, P' may be estimated by the binary search (B, H, min_angle, max_angle), and the min_angle and the max_angle may be updated. Meanwhile, the binary_search (B, H, min_angle, max_angle) may be a function capable of searching for the pitch such that the height of the bounding box B of the first target object becomes the first height H.

Figure 3A:
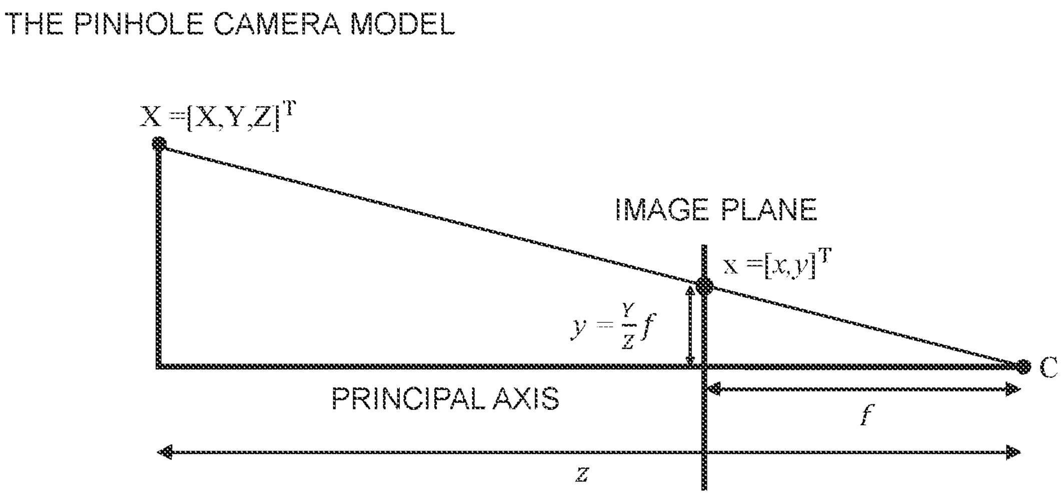
FIGS. 3A and 3B are drawings schematically illustrating a process of estimating the pitch by using a height of an object in the method for calibrating the pitch of the camera on the specific vehicle in accordance with one example embodiment of the present disclosure.
Figure 3B:
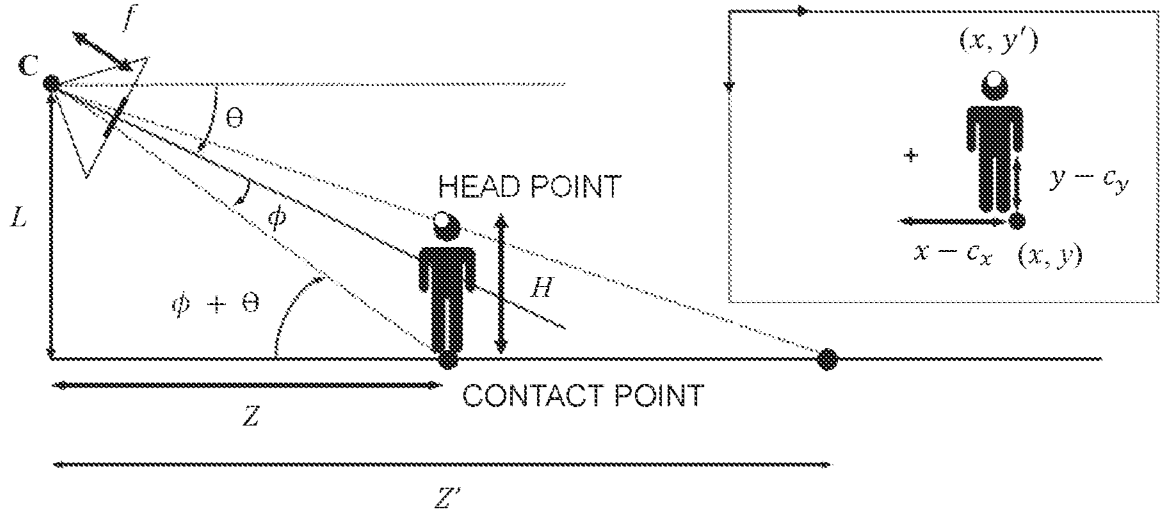

Also, by referring to FIGS. 3A and 3B, according to a proportion equation, i.e., focal length: the height of the bounding box=Z: target object height (that is, the first height), based on a triangle proportionality of a pinhole camera model as shown in FIG. 3A, the object-based pitch estimation module 1100 may perform or support another device to perform a process of calculating the distance Z of the target object by using a following equation, i.e., the distance Z=(the focal length)×(the target object height)/(the height of the bounding box), and a process of estimating the first pitch θ by a following equation using the calculated distance Z as shown in FIG. 3B.

$$Z = \frac{L}{\tan(\varphi + \theta)}$$

$$\theta = tan^{-1}\frac{y - c_y}{f}$$

$$X = \frac{x - c_x}{f}Z, \quad H = \frac{Z' - Z}{Z'}L$$

Second, the object-based pitch estimation module 1100 may select a third specific object, whose lateral distance is smallest among the third candidate objects, as the second target object. Herein, the third candidate objects may be determined as objects (1) whose lateral distances from the specific vehicle are equal to or less than a third distance threshold, (2) whose bounding boxes are not truncated, (3) whose object classes are the vehicle class, (4) which are not occluded, (5) whose differences between 2D bounding boxes and 3D bounding boxes among the bounding boxes thereof are equal to or less than a box difference threshold, and (6) whose aspect ratios of the bounding boxes thereof are equal to or greater than a ratio threshold, by referring to the object profiling information.

Herein, each of the lateral distances may be each of distances between each of the objects and the specific vehicle in the direction perpendicular to the widthwise direction of the specific vehicle, but the scope of the present disclosure is not limited thereto, and any lateral distance suitable for easy recognition of the objects may be set as the third distance threshold. For example, the third distance threshold may be 3 meters. Meanwhile, objects whose bounding boxes are not truncated may be objects whose bounding boxes are not intersecting the boundary of the driving image. As other examples, the objects having the vehicle class may be objects classified by the object detector as having classes corresponding to the types of the vehicles such as the sedans, SUVs, trucks, buses, etc. And objects not occluded may be objects whose bounding boxes intersect none of bounding boxes of other objects, or may be objects whose bottom coordinates of their bounding boxes are closer to the bottom of the driving image if their bounding boxes intersect at least part of the bounding boxes of said other objects. Also, objects whose differences between 2D bounding boxes and 3D bounding boxes among the bounding boxes thereof are equal to or less than the box difference threshold may be objects in near front of the specific vehicle.

And objects whose aspect ratios of the bounding boxes thereof are equal to or greater than the ratio threshold may be objects whose sides are not seen from the front of the specific vehicle. That is, on crossroads, an object whose side is seen from the front of the specific vehicle is bounded by a bounding box with a small aspect ratio, thus an object whose aspect ratio of its bounding box is less than the ratio threshold is not selected.

Then, the object-based pitch estimation module 1100 may acquire a width of the second target object by referring to the vehicle class of the second target object.

Herein, the width of the second target object may be determined according to the width which is set for each of the types of the vehicles. As one example, the width for a type of the sedans and SUVs or vehicles of similar sizes may be set as 1.8 m, and may be set as 1.8 m for a type of the buses and trucks or vehicles of similar sizes, but the scope of the present disclosure is not limited thereto, and may be set as each constant for each of the types of the vehicles. Also, since variances of widths across the types of the vehicles in a same vehicle class are small, the width may be set as the same for the same vehicle class of the vehicles.

Figure 4A:
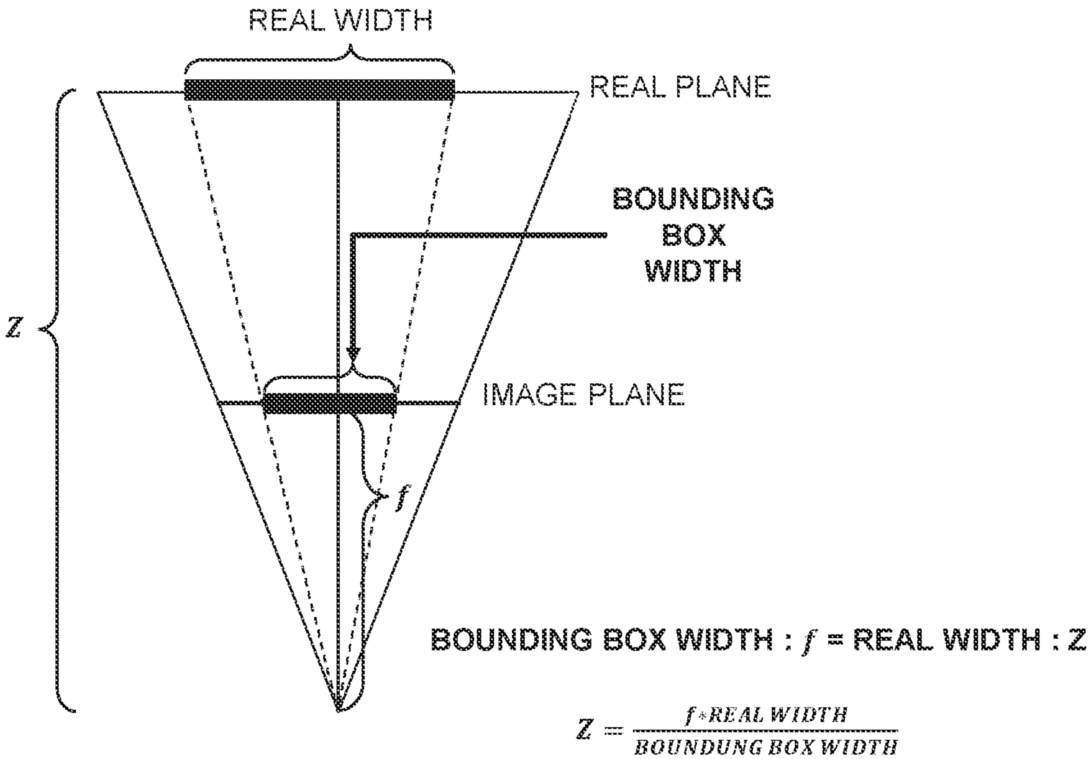
FIGS. 4A and 4B are drawings schematically illustrating a process of estimating the pitch by using a width of the object in the method for calibrating the pitch of the camera on the specific vehicle in accordance with one example embodiment of the present disclosure.
Figure 4B:
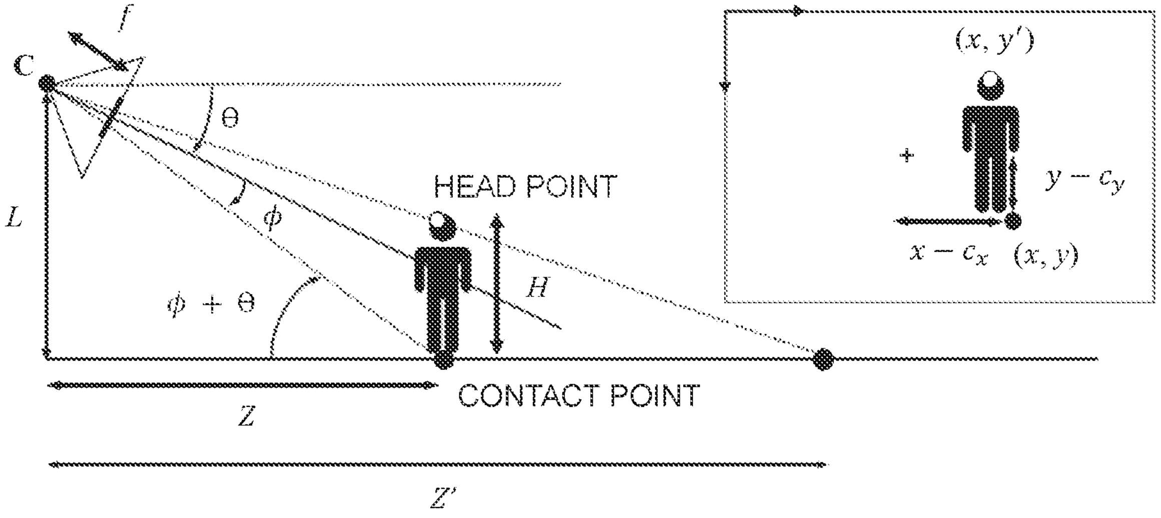

And, by referring to FIGS. 4A and 4B, according to a proportion equation, i.e., (the width of the bounding box):(the focal length)=(target object width):Z of the second target object, based on the triangle proportionality of the pinhole camera model as shown in FIG. 4A, the object-based pitch estimation module 1100 may perform or support another device to perform a process of calculating the distance by using a following equation, i.e., the distance Z=(the focal length)×(the target object width)/(the width of the bounding box), and a process of estimating the second pitch θ by a following equation using the calculated distance Z as shown in FIG. 4B.

$$Z = \frac{L}{\tan(\varphi + \theta)}$$

$$\theta = tan^{-1}\frac{y - c_y}{f}$$

$$X = \frac{x - c_x}{f}Z, \quad H = \frac{Z' - Z}{Z'}L$$

Third, the lane-based pitch estimation module 1220 may (i) select a first lane and a second lane, (1) whose lengths are equal to or greater than a length threshold, (2) which are straight, and (3) which are parallel to each other on a coordinate system of the specific vehicle, by referring to the lane profiling information, (ii) detect a target vanishing point by using the first lane and the second lane, and (iii) execute the third pitch estimation by using the target vanishing point.

As one example, the lane-based pitch estimation module 1220 may select the first lane and the second lane, which are (1) straight, (2) equal to or greater than the length threshold, and (3) parallel to each other on the coordinate system of the specific vehicle, as the lanes to be used for detecting the vanishing point. Herein, the first lane and the second lane may be selected, as the lanes to be used for detecting the vanishing point, by referring to the lane profiling information including (1) a degree of straightness representing how straight the lane detected from the driving image is, (2) a length of the lane detected from the driving image, and (3) a slope of the lane in the vehicle coordinates. Also, when transforming the coordinates of the lanes from a coordinate system of the driving image into the coordinate system of the specific vehicle, one or more camera parameters of a previous frame may be used.

And, the lane-based pitch module 1220 may calculate an intersection point using line equations of the selected first lane and the selected second lane, to thereby detect the vanishing point, and may estimate the third pitch by using the detected vanishing point and a center of the camera.

Figure 5:
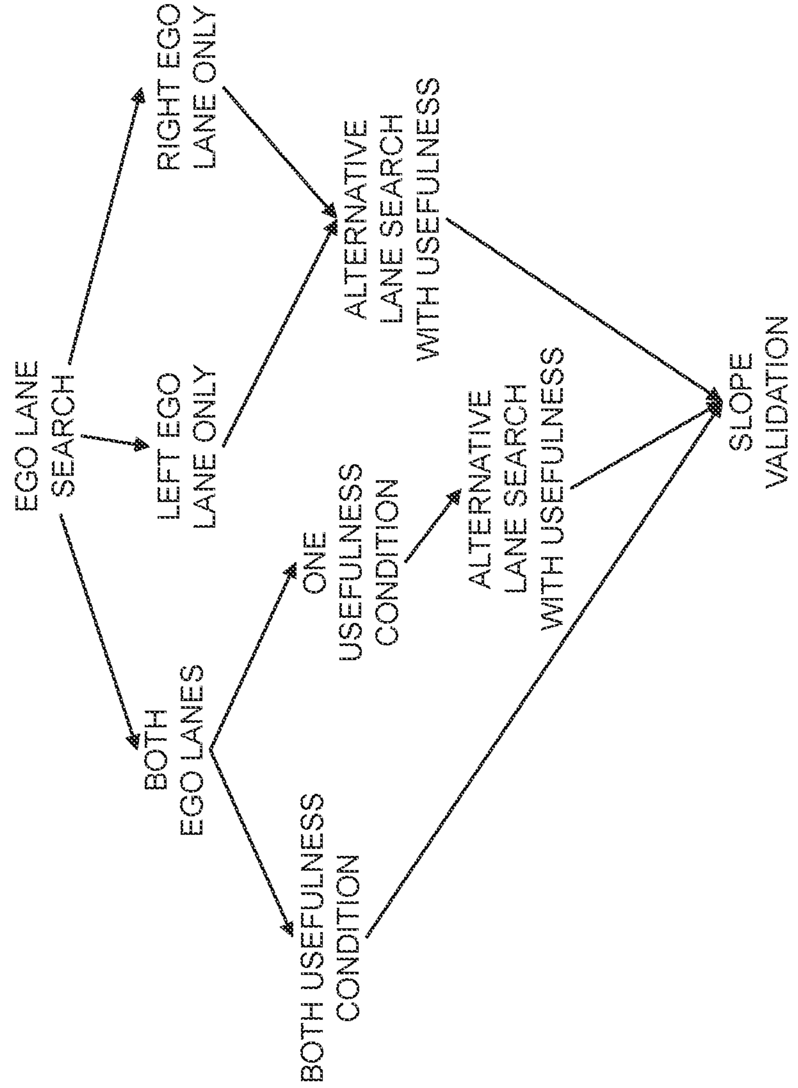
FIG. 5 is a drawing schematically illustrating a process of selecting an ego-lane in a driving image in the method for calibrating the pitch of the camera on the specific vehicle in accordance with one example embodiment of the present disclosure.

Herein, if n lanes are detected, two of the lanes may be selected thereamong by using a search tree as shown in FIG. 5.

That is, if two ego-lanes, corresponding to the specific vehicle, among the lanes are detected, then whether a usefulness condition is satisfied is checked. Herein, the usefulness condition represents that the two ego-lanes are straight and equal to or longer than the length threshold. And if the two ego-lanes satisfy the usefulness condition, then whether a slope validation condition is satisfied is checked. Herein, the slope validation condition represents that the two ego-lanes are parallel to each other. And if only one of the two ego-lanes satisfies the usefulness condition, then an alternative lane satisfying the usefulness condition is searched for, and whether the slope validation condition is satisfied is checked again for the alternative lane. As another example, if a left ego-lane only is detected or a right ego-lane only is detected, then an alternative lane satisfying the usefulness condition is searched for, and whether the slope validation condition is satisfied is checked for the alternative lane. As a result, two lanes may be selected which satisfy the usefulness condition and the slope validation condition.

Fourth, the lane-based pitch estimation module 1220 may detect and track the vanishing point by using the vanishing point detection information of the VP estimation network 1210, and may estimate the fourth pitch using the tracked vanishing point by referring to an EOL (end of line) pitch. Herein, the EOL pitch may have been set as default when the camera is manufactured.

Figure 6:
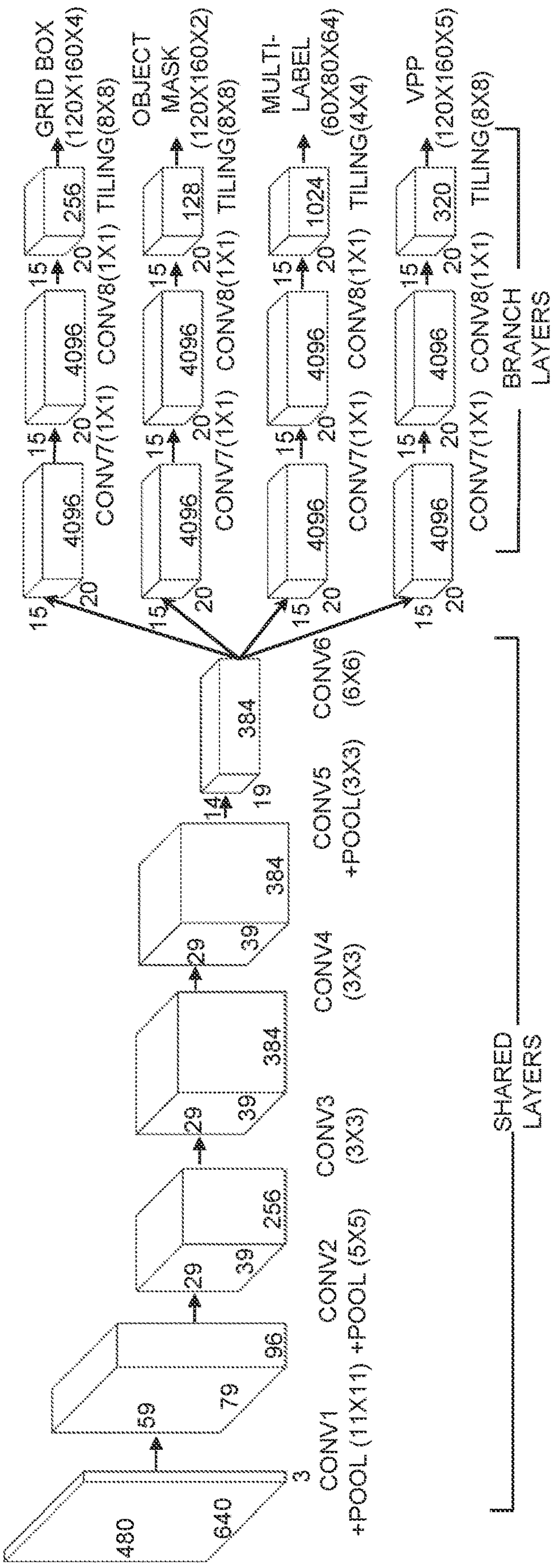
FIG. 6 is a drawing schematically illustrating a VP (vanishing point) estimation network in the method for calibrating the pitch of the camera on the specific vehicle in accordance with one example embodiment of the present disclosure.

Herein, by referring to FIG. 6, the VP estimation network 1210 may use the CNN in order to directly detect the vanishing point from the driving image, or may use a perception-based network capable of simultaneously detecting the lanes and the vanishing point using a multi-task CNN such as a VPGNet (Vanishing Point Guided Network for Lane and Road Marking Detection and Recognition), but the scope of the present disclosure is not limited thereto, and may be configured as an independent vanishing point detection network.

Next, the calibration device 1000 may perform or support another device to perform a process of inputting the first pitch to the fourth pitch into a pitch-deciding module 1300, to thereby allow the pitch-deciding module 1300 to apply ensemble operation to the first pitch to the fourth pitch and thus to generate a decided pitch corresponding to the driving image.

Meanwhile, the first pitch estimation to the fourth pitch estimation may have respective advantages and disadvantages as follows.

The first pitch estimation has advantages that stable pitch estimation is achievable, because the pitch is adjusted to maintain the height. Also, the first pitch estimation may be used for a much broader range of the objects than the second pitch estimation does, due to increase in selectable objects. But the first pitch estimation has disadvantages that the pitch estimation may not be applicable to objects whose range of heights are too broad, such as humans, bicycles, etc.

And, the second pitch estimation has advantages that the stable pitch estimation is achievable, because the pitch is adjusted to maintain the width. And an accuracy of the second pitch estimation is better than that of the first pitch estimation because the width can be held at a constant value since variation among the vehicles is small although the height has a minimum and a maximum. But the second pitch estimation has disadvantages that it is not applicable to humans, bicycles, etc., and that it must be applied to a range of the objects narrower than that of the objects to which the first pitch estimation can be applied, due to limitations in the selectable objects.

And the third pitch estimation has advantages that it is accurate on a straight road and works well on a flat road, but has disadvantages that it is inaccurate on a curved road and works only when a lane is present.

And the fourth pitch estimation has advantages that results are outputted under any circumstance without regard to the objects and the lanes, but has disadvantages that a pitch variance may not be held low due to problems in the accuracy.

Therefore, the calibration device 1000 may allow the pitch-deciding module 1300 to apply the ensemble operation to the first pitch to the fourth pitch, to thereby determine each pitch at each frame of each driving image, in order to enhance the advantages and complement the disadvantages of the first pitch estimation to the fourth pitch estimation.

Figure 7:
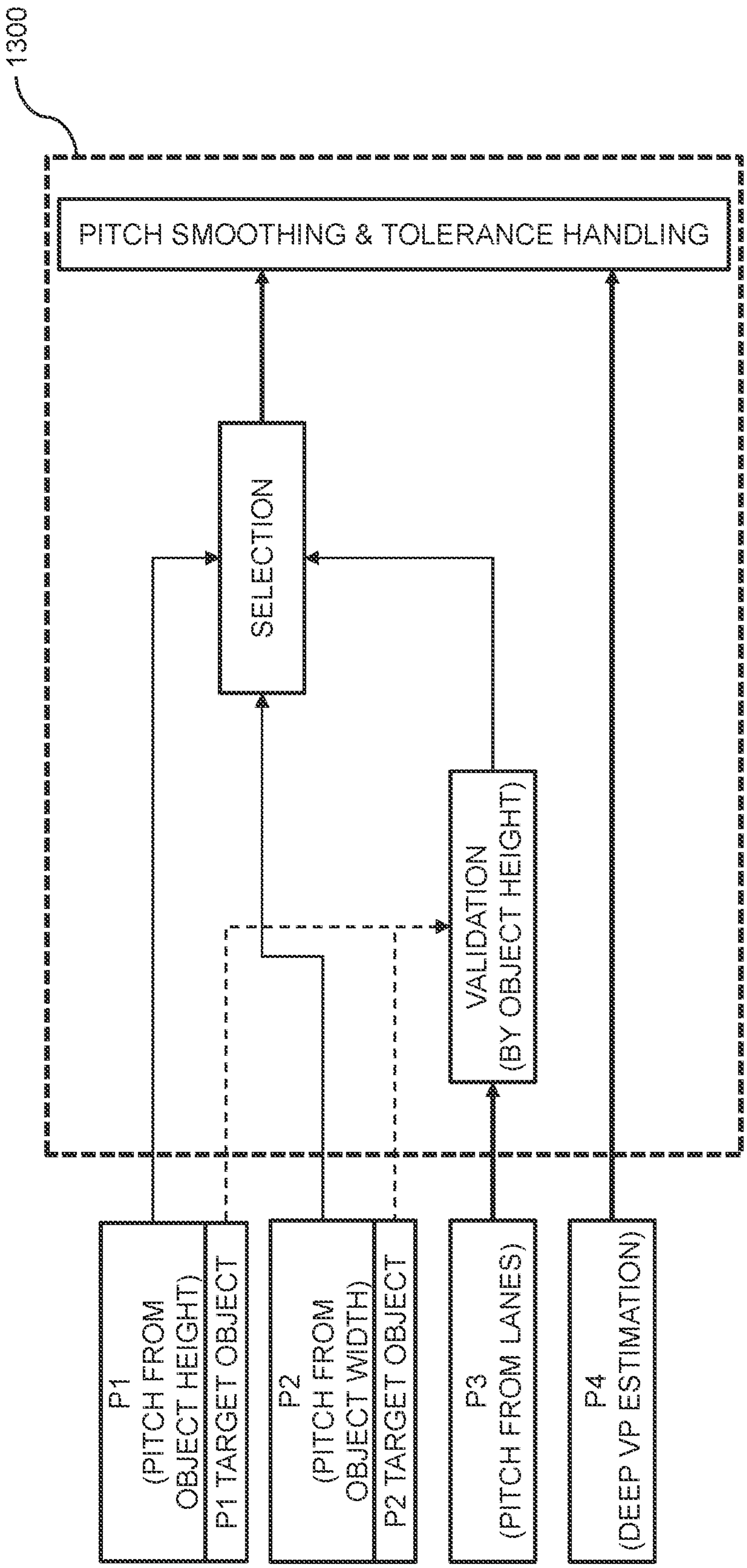
FIG. 7 is a drawing schematically illustrating a process of estimating a decided pitch of the driving image among calculated pitches in the method for calibrating the pitch of the camera on the specific vehicle in accordance with one example embodiment of the present disclosure.

As one example, by referring to FIG. 7, the pitch-deciding module 1300 may (i) select a third target object among the objects by referring to the object profiling information, (ii) calculate a second height of the third target object by using the third pitch, and (iii) validate the third pitch by confirming whether the second height is within a height range. Herein, the pitch-deciding module 1300 may select a first specific object, whose lateral distance is smallest among first candidate objects, as the third target object. In detail, the first candidate objects may be determined as objects (1) whose lateral distances from the specific vehicle are equal to or less than a first distance threshold, (2) whose bounding boxes are not truncated, (3) whose object classes are the vehicle class, and (4) which are not occluded.

Then, if the third pitch is determined as valid, then the pitch-deciding module 1300 may output the third pitch as the decided pitch.

However, if the third pitch is determined as invalid, the pitch-deciding module 1300 may compare the first target object corresponding to the first pitch and the second target object corresponding to the second pitch, and (1) if the first target object and the second target object are determined as identical, may output one of the first pitch and the second pitch as the decided pitch and (2) if the first target object and the second target object are determined as not identical, may output a specific pitch as the decided pitch. Herein, the specific pitch may correspond to a specific target object, whose lateral distance from the specific vehicle is smaller than that of a remaining target object, among the first target object and the second target object.

Also, if none of the objects and the lanes are detected from the driving image, the pitch-deciding module 1300 may output the fourth pitch as the decided pitch.

And the pitch-deciding module 1300 may apply smoothing operation to the decided pitch using its previous pitch in a previous frame, to thereby execute pitch smoothing of the decided pitch and execute tolerance handling which limits a maximal change in the decided pitch from its previous pitch using a pitch change threshold.

That is, the pitch-deciding module 1300 may execute the pitch smoothing of the decided pitch by applying the smoothing operation to the decided pitch using its previous pitch in the previous frame, in order to prevent abrupt changes in the decided pitch, and execute the tolerance handling, to thereby limit the maximal change in the decided pitch from its previous pitch using the pitch change threshold. However, the pitch-deciding module 1300 may lift the limit on the changes in the decided pitch if the object appears for the first time. Also, if the object is on a road plane different from that of the ego-vehicle, the pitch-deciding module 1300 may execute the tolerance handling.

Meanwhile, the VP estimation network 1210 may be trained to detect the vanishing point from the driving image, by continual learning.

Herein, the continual learning of the VP estimation network 1210 may include on-device continual learning, cooperative continual learning, server-side continual learning, etc.

Figure 8:
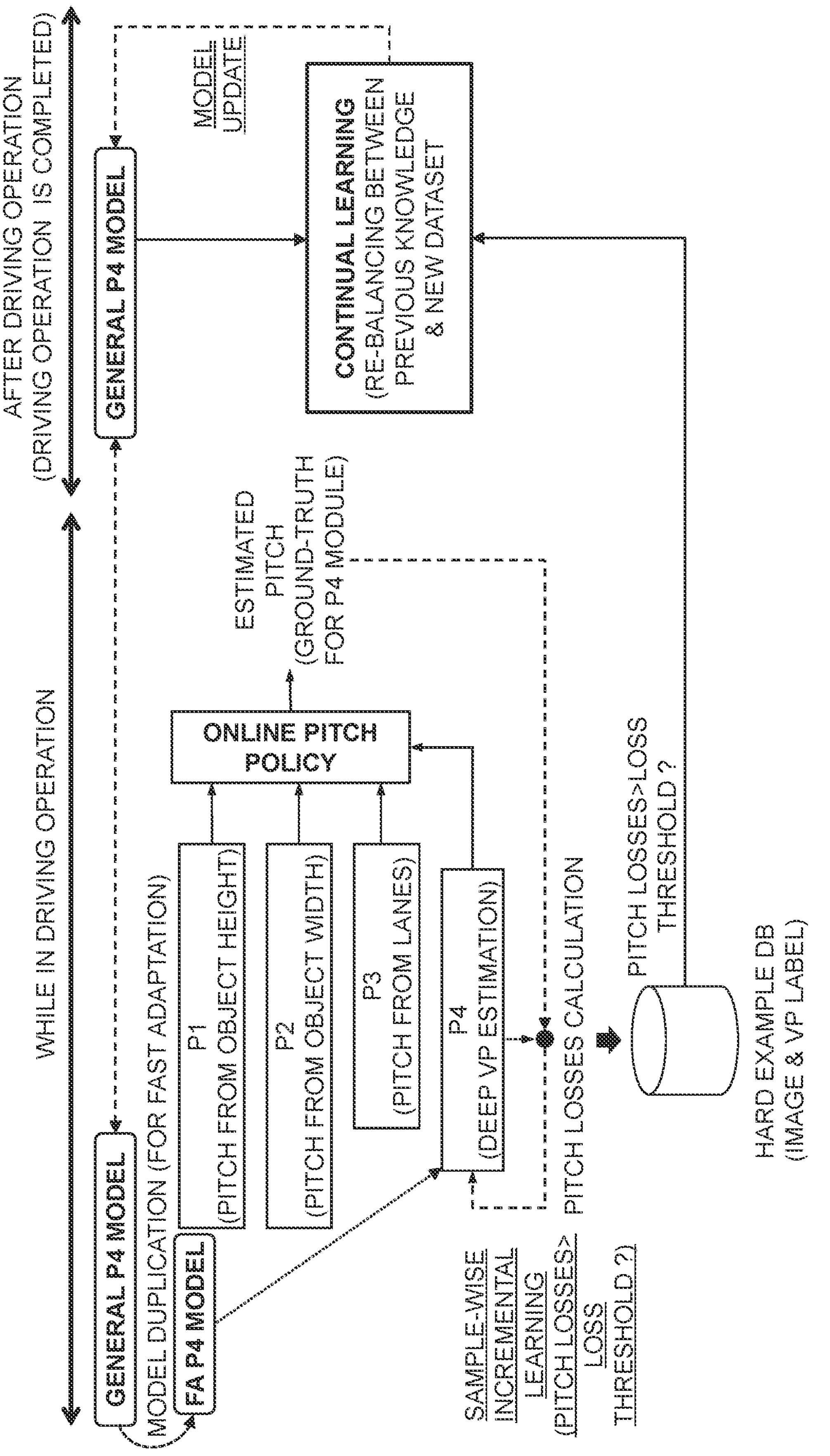
FIGS. 8 to 10 are drawings schematically illustrating a process of continual learning of the VP estimation network in the method for calibrating the pitch of the camera on the specific vehicle in accordance with one example embodiment of the present disclosure.

First, by referring to FIG. 8, the calibration device 1000 may perform or support another device to perform a process of calculating one or more pitch losses by referring to the decided pitch and the fourth pitch and a process of the on-vehicle continual learning of the VP estimation network 1210 by using the pitch losses. Herein, the calibration device 1000 is described as performing a process of the on-device continual learning, however, as another example, another learning device may be used for performing the process of the on-device continual learning.

Herein, the calibration device 1000 may perform or support another device to perform (i) during the driving operation of the specific vehicle, a process of fast-adapting by instance-wise incremental learning of the VP estimation network 1210 using the pitch losses and (ii) after completion of the driving operation of the specific vehicle, a process of balanced continual learning of the VP estimation network 1210 using sampled data which are sampled during the driving operation, to thereby recover from catastrophic forgetting due to the process of fast-adapting.

That is, in general, driving environment of a vehicle is inputted as continuous image sequences, therefore, if the vanishing point is estimated incorrectly in a certain frame, then it is highly probable that the incorrect vanishing point is maintained in following frames. Thus, by referring to FIG. 8, in the process of the on-device continual learning, while the ego-vehicle is in the driving operation, the pitch losses may be calculated by referring to the decided pitch outputted from the pitch-deciding module 1300 and the fourth pitch, and if the pitch losses are greater than a loss threshold, then instance-wise incremental learning for fast adaptation may be performed, and after the driving operation of the ego-vehicle is completed, the balanced continual learning may be performed by using the sampled data which are sampled during the driving operation of the ego-vehicle, in order to recover from the catastrophic forgetting that may have happened as a result of the fast adaptation during the driving operation of the ego-vehicle.

Figure 9:
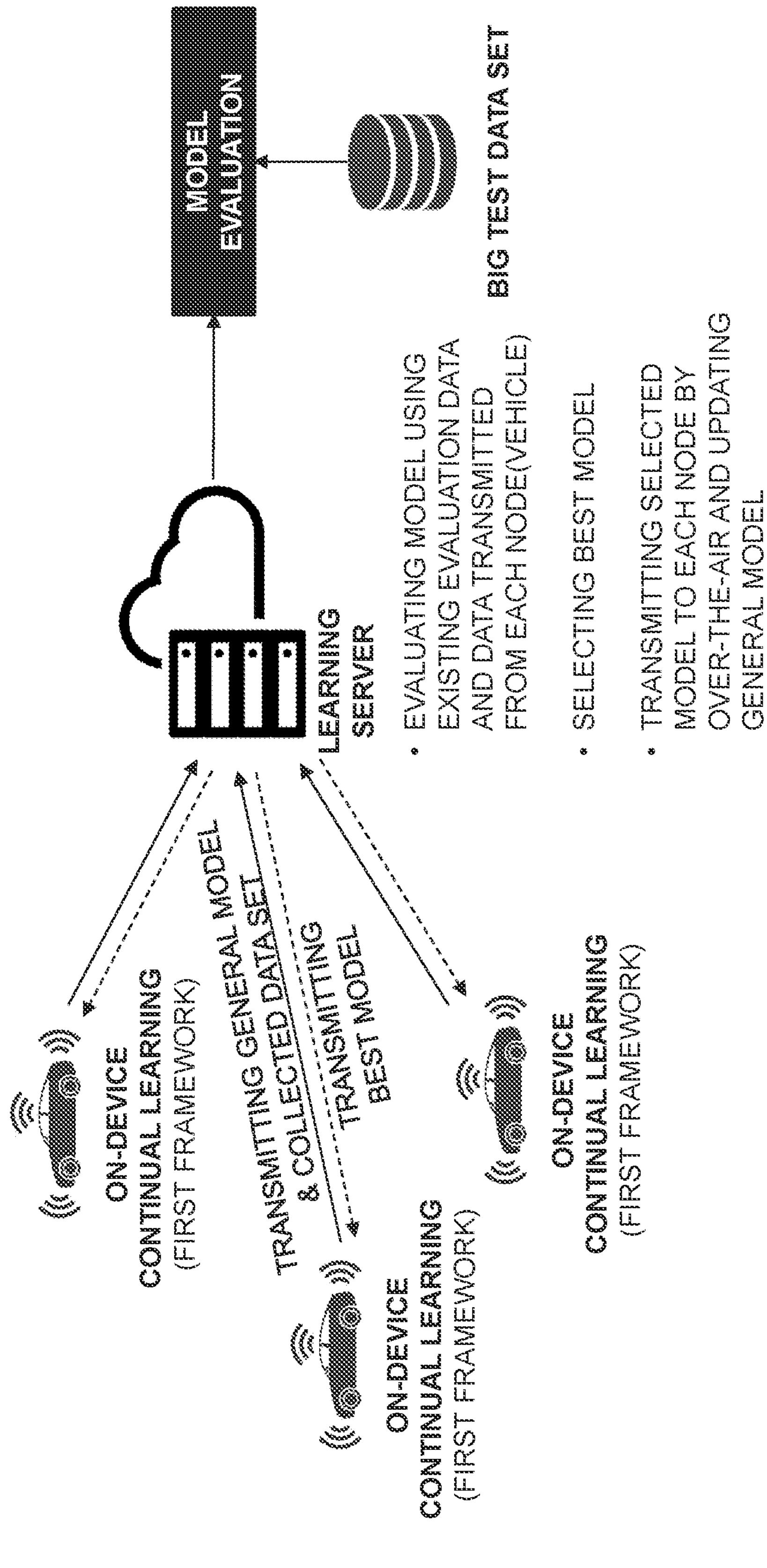

Also, by referring to FIG. 9, the cooperative continual learning may include processes as follows: the calibration device 1000 performs or supports another device to perform (i) a process of transmitting a trained VP estimation network model, created by the on-vehicle continual learning, to a learning server, to thereby allow the learning server to (i-1) evaluate the trained VP estimation network model and at least one another trained VP estimation network model received from at least one another vehicle and thus (i-2) select a best VP estimation network model and transmit the best VP estimation network model to the calibration device 1000 and (ii) a process of updating the VP estimation network 1210 by using the best VP estimation network model received from the learning server.

That is, (i) each of vehicles may perform its own continual learning according to the on-device continual learning described by referring to FIG. 8, (ii) each of trained models and data may be transmitted from each of the vehicles to the learning server, (iii) the learning server may evaluate each of the trained models of each of the vehicles, to thereby select a best model, and (iv) the learning server may transmit the selected best model to each of the vehicles, to thereby allow each of the vehicles to update its VP estimation network by the cooperative continual learning.

Figure 10:
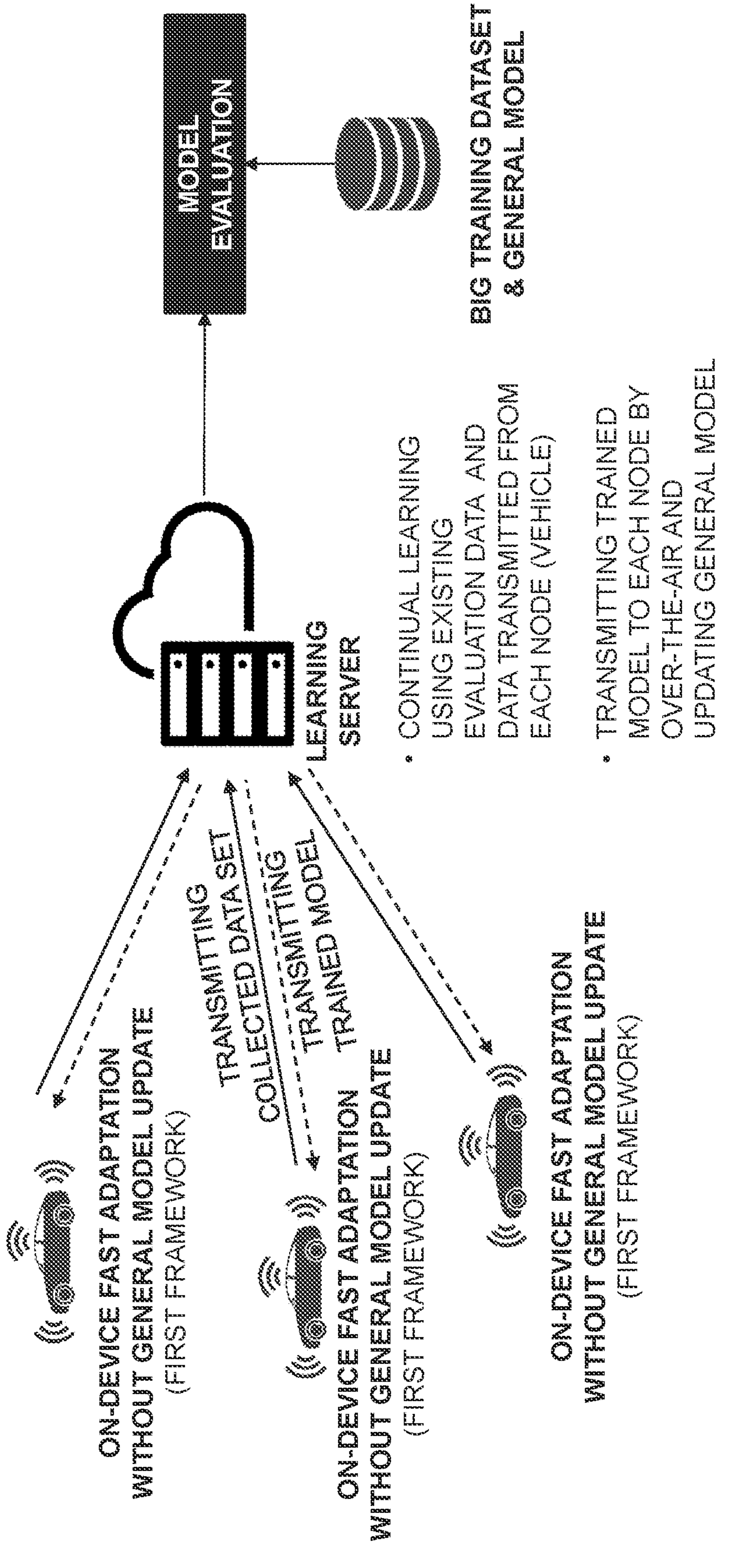

Also, by referring to FIG. 10, the server-side continual learning may include processes as follows: the calibration device 1000 performs or supports another device to perform (i) during the driving operation of the specific vehicle, a process of fast-adapting by instance-wise incremental learning of the VP estimation network 1210 using the pitch losses, (ii) a process of transmitting the sampled data, used during the instance-wise incremental learning, to the learning server, to thereby allow the learning server to (ii-1) execute the server-side continual learning of a reference VP estimation network, corresponding to the VP estimation network 1210, by using the sampled data and (ii-2) transmit one or more parameters, updated through the server-side continual learning, to the calibration device 1000, and (iii) after completion of the driving operation of the specific vehicle, a process of updating the VP estimation network 1210 by using the parameters received from the learning server.

That is, (i) each of the vehicles may perform the fast adaptation only, and (ii) the learning server may perform the continual learning and transmit the VP estimation network or its corresponding parameters, which has completed the continual learning, to each of the vehicles for update.

The present disclosure has an effect of using outputs of a perception module included in an advanced driver-assistance system (ADAS) of the vehicle, to thereby estimate the pitch of the camera on the vehicle more accurately than conventional methods.

The present disclosure has another effect of using outputs of the perception module included in the ADAS of the vehicle, to thereby estimate the pitch of the camera on the vehicle with less computational load than that in the conventional methods.

The present disclosure has still another effect of continual learning of vanishing point estimation for detecting the vanishing point, to thereby accurately detect the vanishing point, and as a result, more accurately estimating the pitch of the camera on the vehicle.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for calibrating at least one pitch of at least one camera on a specific vehicle, comprising steps of:

(a) if at least one driving image is acquired from the camera during driving operation of the specific vehicle, a calibration device performing or supporting another device to perform a process of inputting the driving image respectively into an object detection network and a lane detection network, to thereby allow (i) the object detection network to detect one or more objects on the driving image and thus to generate object detection information on the objects, and (ii) the lane detection network to detect one or more lanes on the driving image and thus to generate lane detection information on the lanes;

(b) the calibration device performing or supporting another device to perform (i) a process of profiling the object detection information to thereby generate each piece of object profiling information corresponding to each of the objects and a process of profiling the lane detection information to thereby generate each piece of lane profiling information corresponding to each of the lanes, (ii) a process of inputting the object profiling information into an object-based pitch estimation module to allow the object-based pitch estimation module to (ii-1) select a first target object among the objects by referring to the object profiling information and execute a first pitch estimation using a first height of the first target object, to thereby generate a first pitch and (ii-2) select a second target object among the objects by referring to the object profiling information and execute a second pitch estimation using a width of the second target object, to thereby generate a second pitch, and (iii) a process of inputting vanishing point detection information and the lane profiling information into a lane-based pitch estimation module, wherein the vanishing point detection information is generated by a VP (vanishing point) estimation network capable of analyzing the driving image and thus detecting at least one vanishing point, to thereby allow the lane-based pitch estimation module to (iii-1) execute a third pitch estimation using the lane profiling information and thus generate a third pitch and (iii-2) execute a fourth pitch estimation using the vanishing point detection information and thus generate a fourth pitch; and (c) the calibration device performing or supporting another device to perform a process of inputting the first pitch to the fourth pitch into a pitch-deciding module, to thereby allow the pitch-deciding module to apply ensemble operation to the first pitch to the fourth pitch and thus to generate a decided pitch corresponding to the driving image;

wherein, at the step of (c), the calibration device performs or supports another device to perform a process of instructing the pitch-deciding module to (i) select a third target object among the objects by referring to the object profiling information, (ii) calculate a second height of the third target object by using the third pitch, (iii) validate the third pitch by confirming whether the second height is within a height range, (iv) (iv-1) if the third pitch is determined as valid, output the third pitch as the decided pitch, and (iv-2) if the third pitch is determined as invalid, compare the first target object corresponding to the first pitch and the second target object corresponding to the second pitch, and (iv-2-a) if the first target object and the second target object are determined as identical, output one of the first pitch and the second pitch as the decided pitch and (iv-2-b) if the first target object and the second target object are determined as not identical, output a specific pitch as the decided pitch, wherein the specific pitch corresponds to a specific target object, whose lateral distance from the specific vehicle is smaller than that of a remaining target object, among the first target object and the second target object, and (v) if none of the objects and the lanes are detected from the driving image, output the fourth pitch as the decided pitch.

2. The method of claim 1, wherein the calibration device performs or supports another device to perform a process of instructing the pitch-deciding module to select a first specific object, whose lateral distance is smallest, as the third target object and wherein the first specific object is selected among first candidate objects (1) whose lateral distances from the specific vehicle are equal to or less than a first distance threshold, (2) whose bounding boxes are not truncated, (3) whose object classes are a vehicle class, and (4) which are not occluded.

3. The method of claim 1, wherein, at the step of (c), the calibration device performs or supports another device to perform a process of instructing the pitch-deciding module to apply smoothing operation to the decided pitch using its previous pitch in a previous frame, to thereby execute pitch smoothing of the decided pitch and execute tolerance handling which limits a maximal change in the decided pitch from its previous pitch using a pitch change threshold.

4. A method for calibrating at least one pitch of at least one camera on a specific vehicle, comprising steps of:

(a) if at least one driving image is acquired from the camera during driving operation of the specific vehicle, a calibration device performing or supporting another device to perform a process of inputting the driving image respectively into an object detection network and a lane detection network, to thereby allow (i) the object detection network to detect one or more objects on the driving image and thus to generate object detection information on the objects, and (ii) the lane detection network to detect one or more lanes on the driving image and thus to generate lane detection information on the lanes;

(b) the calibration device performing or supporting another device to perform (i) a process of profiling the object detection information to thereby generate each piece of object profiling information corresponding to each of the objects and a process of profiling the lane detection information to thereby generate each piece of lane profiling information corresponding to each of the lanes, (ii) a process of inputting the object profiling information into an object-based pitch estimation module to allow the object-based pitch estimation module to (ii-1) select a first target object among the objects by referring to the object profiling information and execute a first pitch estimation using a first height of the first target object, to thereby generate a first pitch and (ii-2) select a second target object among the objects by referring to the object profiling information and execute a second pitch estimation using a width of the second target object, to thereby generate a second pitch, and (iii) a process of inputting vanishing point detection information and the lane profiling information into a lane-based pitch estimation module, wherein the vanishing point detection information is generated by a VP (vanishing point) estimation network capable of analyzing the driving image and thus detecting at least one vanishing point, to thereby allow the lane-based pitch estimation module to (iii-1) execute a third pitch estimation using the lane profiling information and thus generate a third pitch and (iii-2) execute a fourth pitch estimation using the vanishing point detection information and thus generate a fourth pitch;

(c) the calibration device performing or supporting another device to perform a process of inputting the first pitch to the fourth pitch into a pitch-deciding module, to thereby allow the pitch-deciding module to apply ensemble operation to the first pitch to the fourth pitch and thus to generate a decided pitch corresponding to the driving image;

(d) the calibration device performing or supporting another device to perform a process of calculating one or more pitch losses by referring to the decided pitch and the fourth pitch and a process of on-vehicle continual learning of the VP estimation network by using the pitch losses;

wherein the calibration device performs or supports another device to perform (i) during the driving operation of the specific vehicle, a process of fast-adapting by instance-wise incremental learning of the VP estimation network using the pitch losses and (ii) after completion of the driving operation of the specific vehicle, a process of balanced continual learning of the VP estimation network using sampled data sampled during the driving operation, to thereby recover from catastrophic forgetting due to the process of fast-adapting.

5. A method for calibrating at least one pitch of at least one camera on a specific vehicle, comprising steps of:

(a) if at least one driving image is acquired from the camera during driving operation of the specific vehicle, a calibration device performing or supporting another device to perform a process of inputting the driving image respectively into an object detection network and a lane detection network, to thereby allow (i) the object detection network to detect one or more objects on the driving image and thus to generate object detection information on the objects, and (ii) the lane detection network to detect one or more lanes on the driving image and thus to generate lane detection information on the lanes;

(b) the calibration device performing or supporting another device to perform (i) a process of profiling the object detection information to thereby generate each piece of object profiling information corresponding to each of the objects and a process of profiling the lane detection information to thereby generate each piece of lane profiling information corresponding to each of the lanes, (ii) a process of inputting the object profiling information into an object-based pitch estimation module to allow the object-based pitch estimation module to (ii-1) select a first target object among the objects by referring to the object profiling information and execute a first pitch estimation using a first height of the first target object, to thereby generate a first pitch and (ii-2) select a second target object among the objects by referring to the object profiling information and execute a second pitch estimation using a width of the second target object, to thereby generate a second pitch, and (iii) a process of inputting vanishing point detection information and the lane profiling information into a lane-based pitch estimation module, wherein the vanishing point detection information is generated by a VP (vanishing point) estimation network capable of analyzing the driving image and thus detecting at least one vanishing point, to thereby allow the lane-based pitch estimation module to (iii-1) execute a third pitch estimation using the lane profiling information and thus generate a third pitch and (iii-2) execute a fourth pitch estimation using the vanishing point detection information and thus generate a fourth pitch;

(c) the calibration device performing or supporting another device to perform a process of inputting the first pitch to the fourth pitch into a pitch-deciding module, to thereby allow the pitch-deciding module to apply ensemble operation to the first pitch to the fourth pitch and thus to generate a decided pitch corresponding to the driving image; and (d) the calibration device performing or supporting another device to perform a process of calculating one or more pitch losses by referring to the decided pitch and the fourth pitch and a process of on-vehicle continual learning of the VP estimation network by using the pitch losses;

wherein the calibration device performs or supports another device to perform (i) during the driving operation of the specific vehicle, a process of fast-adapting by instance-wise incremental learning of the VP estimation network using the pitch losses, (ii) a process of transmitting the sampled data, used during the instance-wise incremental learning, to a learning server, to thereby allow the learning server to (ii-1) execute server-side continual learning of a reference VP estimation network, corresponding to the VP estimation network, by using the sampled data and (ii-2) transmit one or more parameters, updated through the server-side continual learning, to the calibration device, and (iii) after completion of the driving operation of the specific vehicle, a process of updating the VP estimation network by using the parameters received from the learning server.

6. A method for calibrating at least one pitch of at least one camera on a specific vehicle, comprising steps of:

(a) if at least one driving image is acquired from the camera during driving operation of the specific vehicle, a calibration device performing or supporting another device to perform a process of inputting the driving image respectively into an object detection network and a lane detection network, to thereby allow (i) the object detection network to detect one or more objects on the driving image and thus to generate object detection information on the objects, and (ii) the lane detection network to detect one or more lanes on the driving image and thus to generate lane detection information on the lanes;

(b) the calibration device performing or supporting another device to perform (i) a process of profiling the object detection information to thereby generate each piece of object profiling information corresponding to each of the objects and a process of profiling the lane detection information to thereby generate each piece of lane profiling information corresponding to each of the lanes, (ii) a process of inputting the object profiling information into an object-based pitch estimation module to allow the object-based pitch estimation module to (ii-1) select a first target object among the objects by referring to the object profiling information and execute a first pitch estimation using a first height of the first target object, to thereby generate a first pitch and (ii-2) select a second target object among the objects by referring to the object profiling information and execute a second pitch estimation using a width of the second target object, to thereby generate a second pitch, and (iii) a process of inputting vanishing point detection information and the lane profiling information into a lane-based pitch estimation module, wherein the vanishing point detection information is generated by a VP (vanishing point) estimation network capable of analyzing the driving image and thus detecting at least one vanishing point, to thereby allow the lane-based pitch estimation module to (iii-1) execute a third pitch estimation using the lane profiling information and thus generate a third pitch and (iii-2) execute a fourth pitch estimation using the vanishing point detection information and thus generate a fourth pitch;

(c) the calibration device performing or supporting another device to perform a process of inputting the first pitch to the fourth pitch into a pitch-deciding module, to thereby allow the pitch-deciding module to apply ensemble operation to the first pitch to the fourth pitch and thus to generate a decided pitch corresponding to the driving image;

(d) the calibration device performing or supporting another device to perform a process of calculating one or more pitch losses by referring to the decided pitch and the fourth pitch and a process of on-vehicle continual learning of the VP estimation network by using the pitch losses; and (e) the calibration device performing or supporting another device to perform (i) a process of transmitting a trained VP estimation network model, created by the on-vehicle continual learning, to a learning server, to thereby allow the learning server to (i-1) evaluate the trained VP estimation network model and at least one another trained VP estimation network model received from at least one another vehicle and thus (i-2) select a best VP estimation network model and transmit the best VP estimation network model to the calibration device and (ii) a process of updating the VP estimation network by using the best VP estimation network model received from the learning server.

7. A method for calibrating at least one pitch of at least one camera on a specific vehicle, comprising steps of:

(a) if at least one driving image is acquired from the camera during driving operation of the specific vehicle, a calibration device performing or supporting another device to perform a process of inputting the driving image respectively into an object detection network and a lane detection network, to thereby allow (i) the object detection network to detect one or more objects on the driving image and thus to generate object detection information on the objects, and (ii) the lane detection network to detect one or more lanes on the driving image and thus to generate lane detection information on the lanes;

(b) the calibration device performing or supporting another device to perform (i) a process of profiling the object detection information to thereby generate each piece of object profiling information corresponding to each of the objects and a process of profiling the lane detection information to thereby generate each piece of lane profiling information corresponding to each of the lanes, (ii) a process of inputting the object profiling information into an object-based pitch estimation module to allow the object-based pitch estimation module to (ii-1) select a first target object among the objects by referring to the object profiling information and execute a first pitch estimation using a first height of the first target object, to thereby generate a first pitch and (ii-2) select a second target object among the objects by referring to the object profiling information and execute a second pitch estimation using a width of the second target object, to thereby generate a second pitch, and (iii) a process of inputting vanishing point detection information and the lane profiling information into a lane-based pitch estimation module, wherein the vanishing point detection information is generated by a VP (vanishing point) estimation network capable of analyzing the driving image and thus detecting at least one vanishing point, to thereby allow the lane-based pitch estimation module to (iii-1) execute a third pitch estimation using the lane profiling information and thus generate a third pitch and (iii-2) execute a fourth pitch estimation using the vanishing point detection information and thus generate a fourth pitch; and (c) the calibration device performing or supporting another device to perform a process of inputting the first pitch to the fourth pitch into a pitch-deciding module, to thereby allow the pitch-deciding module to apply ensemble operation to the first pitch to the fourth pitch and thus to generate a decided pitch corresponding to the driving image;

wherein, at the step of (b), the calibration device performs or supports another device to perform a process of instructing the object-based pitch estimation module to (i) select a second specific object, whose lateral distance is smallest, as the first target object, wherein the second specific object is selected among second candidate objects (1) whose lateral distances from the specific vehicle are equal to or less than a second distance threshold, (2) whose bounding boxes are not truncated, (3) whose object classes are a vehicle class, and (4) which are not occluded, by referring to the object profiling information, (ii) acquire an average height of the first target object by referring to detection history of the first target object, and (iii) (iii-1) if the average height is equal to or greater than a minimum height threshold and equal to or less than a maximum height threshold, then determine the average height as the first height and (iii-2) if the average height is less than the minimum height threshold or greater than the maximum height threshold, then determine an average of the minimum height threshold and the maximum height threshold as the first height.

8. A method for calibrating at least one pitch of at least one camera on a specific vehicle, comprising steps of:

(a) if at least one driving image is acquired from the camera during driving operation of the specific vehicle, a calibration device performing or supporting another device to perform a process of inputting the driving image respectively into an object detection network and a lane detection network, to thereby allow (i) the object detection network to detect one or more objects on the driving image and thus to generate object detection information on the objects, and (ii) the lane detection network to detect one or more lanes on the driving image and thus to generate lane detection information on the lanes;

(b) the calibration device performing or supporting another device to perform (i) a process of profiling the object detection information to thereby generate each piece of object profiling information corresponding to each of the objects and a process of profiling the lane detection information to thereby generate each piece of lane profiling information corresponding to each of the lanes, (ii) a process of inputting the object profiling information into an object-based pitch estimation module to allow the object-based pitch estimation module to (ii-1) select a first target object among the objects by referring to the object profiling information and execute a first pitch estimation using a first height of the first target object, to thereby generate a first pitch and (ii-2) select a second target object among the objects by referring to the object profiling information and execute a second pitch estimation using a width of the second target object, to thereby generate a second pitch, and (iii) a process of inputting vanishing point detection information and the lane profiling information into a lane-based pitch estimation module, wherein the vanishing point detection information is generated by a VP (vanishing point) estimation network capable of analyzing the driving image and thus detecting at least one vanishing point, to thereby allow the lane-based pitch estimation module to (iii-1) execute a third pitch estimation using the lane profiling information and thus generate a third pitch and (iii-2) execute a fourth pitch estimation using the vanishing point detection information and thus generate a fourth pitch; and (c) the calibration device performing or supporting another device to perform a process of inputting the first pitch to the fourth pitch into a pitch-deciding module, to thereby allow the pitch-deciding module to apply ensemble operation to the first pitch to the fourth pitch and thus to generate a decided pitch corresponding to the driving image;

wherein, at the step of (b), the calibration device performs or supports another device to perform a process of instructing the object-based pitch estimation module to select a third specific object, whose lateral distance is smallest, as the second target object, wherein the third specific object is selected among third candidate objects (1) whose lateral distances from the specific vehicle are equal to or less than a third distance threshold, (2) whose bounding boxes are not truncated, (3) whose object classes are a vehicle class, (4) which are not occluded, (5) whose differences between 2D bounding boxes and 3D bounding boxes among the bounding boxes thereof are equal to or less than a box difference threshold, and (6) whose aspect ratios of the bounding boxes thereof are equal to or greater than a ratio threshold, by referring to the object profiling information.

9. The method of claim 1, wherein, at the step of (b), the calibration device performs or supports another device to perform a process of allowing the lane-based estimation module to (i) select a first lane and a second lane, (1) whose lengths are equal to or greater than a length threshold, (2) which are straight, and (3) which are parallel to each other on a coordinate system of the specific vehicle, by referring to the lane profiling information, (ii) detect a target vanishing point by using the first lane and the second lane, and (iii) execute the third pitch estimation by using the target vanishing point.

10. A calibration device for calibrating at least one pitch of at least one camera on a specific vehicle, comprising:

at least one memory that stores instructions; and at least one processor configured to execute the instructions to perform or support another device to perform: (I) if at least one driving image is acquired from the camera during driving operation of the specific vehicle, a process of inputting the driving image respectively into an object detection network and a lane detection network, to thereby allow (i) the object detection network to detect one or more objects on the driving image and thus to generate object detection information on the objects, and (ii) the lane detection network to detect one or more lanes on the driving image and thus to generate lane detection information on the lanes, (II) (i) a process of profiling the object detection information to thereby generate each piece of object profiling information corresponding to each of the objects and a process of profiling the lane detection information to thereby generate each piece of lane profiling information corresponding to each of the lanes, (ii) a process of inputting the object profiling information into an object based pitch estimation module to allow the object-based pitch estimation module to (ii-1) select a first target object among the objects by referring to the object profiling information and execute a first pitch estimation using a first height of the first target object, to thereby generate a first pitch and (ii-2) select a second target object among the objects by referring to the object profiling information and execute a second pitch estimation using a width of the second target object, to thereby generate a second pitch, and (iii) a process of inputting vanishing point detection information and the lane profiling information into a lane-based pitch estimation module, wherein the vanishing point detection information is generated by a VP (vanishing point) estimation network capable of analyzing the driving image and thus detecting at least one vanishing point, to thereby allow the lane-based pitch estimation module to (iii-1) execute a third pitch estimation using the lane profiling information and thus generate a third pitch and (iii-2) execute a fourth pitch estimation using the vanishing point detection information and thus generate a fourth pitch, and (III) a process of inputting the first pitch to the fourth pitch into a pitch-deciding module, to thereby allow the pitch-deciding module to apply ensemble operation to the first pitch to the fourth pitch and thus to generate a decided pitch corresponding to the driving image;

wherein, at the process of (III), the processor performs or supports another device to perform a process of instructing the pitch-deciding module to (i) select a third target object among the objects by referring to the object profiling information, (ii) calculate a second height of the third target object by using the third pitch, (iii) validate the third pitch by confirming whether the second height is within a height range, (iv) (iv-1) if the third pitch is determined as valid, output the third pitch as the decided pitch, and (iv-2) if the third pitch is determined as invalid, compare the first target object corresponding to the first pitch and the second target object corresponding to the second pitch, and (iv-2-a) if the first target object and the second target object are determined as identical, output one of the first pitch and the second pitch as the decided pitch and (iv-2-b) if the first target object and the second target object are determined as not identical, output a specific pitch as the decided pitch, wherein the specific pitch corresponds to a specific target object, whose lateral distance from the specific vehicle is smaller than that of a remaining target object, among the first target object and the second target object, and (v) if none of the objects and the lanes are detected from the driving image, output the fourth pitch as the decided pitch.

11. The calibration device of claim 10, wherein the processor performs or supports another device to perform a process of instructing the pitch-deciding module to select a first specific object, whose lateral distance is smallest, as the third target object and wherein the first specific object is selected among first candidate objects (1) whose lateral distances from the specific vehicle are equal to or less than a first distance threshold, (2) whose bounding boxes are not truncated, (3) whose object classes are a vehicle class, and (4) which are not occluded.

12. The calibration device of claim 10, wherein, at the process of (III), the processor performs or supports another device to perform a process of instructing the pitch-deciding module to apply smoothing operation to the decided pitch using its previous pitch in a previous frame, to thereby execute pitch smoothing of the decided pitch and execute tolerance handling which limits a maximal change in the decided pitch from its previous pitch using a pitch change threshold.

13. A calibration device for calibrating at least one pitch of at least one camera on a specific vehicle, comprising:

at least one memory that stores instructions; and at least one processor configured to execute the instructions to perform or support another device to perform: (I) if at least one driving image is acquired from the camera during driving operation of the specific vehicle, a process of inputting the driving image respectively into an object detection network and a lane detection network, to thereby allow (i) the object detection network to detect one or more objects on the driving image and thus to generate object detection information on the objects, and (ii) the lane detection network to detect one or more lanes on the driving image and thus to generate lane detection information on the lanes, (II) (i) a process of profiling the object detection information to thereby generate each piece of object profiling information corresponding to each of the objects and a process of profiling the lane detection information to thereby generate each piece of lane profiling information corresponding to each of the lanes, (ii) a process of inputting the object profiling information into an object based pitch estimation module to allow the object-based pitch estimation module to (ii-1) select a first target object among the objects by referring to the object profiling information and execute a first pitch estimation using a first height of the first target object, to thereby generate a first pitch and (ii-2) select a second target object among the objects by referring to the object profiling information and execute a second pitch estimation using a width of the second target object, to thereby generate a second pitch, and (iii) a process of inputting vanishing point detection information and the lane profiling information into a lane-based pitch estimation module, wherein the vanishing point detection information is generated by a VP (vanishing point) estimation network capable of analyzing the driving image and thus detecting at least one vanishing point, to thereby allow the lane-based pitch estimation module to (iii-1) execute a third pitch estimation using the lane profiling information and thus generate a third pitch and (iii-2) execute a fourth pitch estimation using the vanishing point detection information and thus generate a fourth pitch, and (III) a process of inputting the first pitch to the fourth pitch into a pitch-deciding module, to thereby allow the pitch-deciding module to apply ensemble operation to the first pitch to the fourth pitch and thus to generate a decided pitch corresponding to the driving image;

wherein the processor further performs: (IV) a process of calculating one or more pitch losses by referring to the decided pitch and the fourth pitch and a process of on-vehicle continual learning of the VP estimation network by using the pitch losses; and wherein the processor performs or supports another device to perform (i) during the driving operation of the specific vehicle, a process of fast-adapting by instance-wise incremental learning of the VP estimation network using the pitch losses and (ii) after completion of the driving operation of the specific vehicle, a process of balanced continual learning of the VP estimation network using sampled data sampled during the driving operation, to thereby recover from catastrophic forgetting due to the process of fast-adapting.

14. A calibration device for calibrating at least one pitch of at least one camera on a specific vehicle, comprising:

at least one memory that stores instructions; and at least one processor configured to execute the instructions to perform or support another device to perform: (I) if at least one driving image is acquired from the camera during driving operation of the specific vehicle, a process of inputting the driving image respectively into an object detection network and a lane detection network, to thereby allow (i) the object detection network to detect one or more objects on the driving image and thus to generate object detection information on the objects, and (ii) the lane detection network to detect one or more lanes on the driving image and thus to generate lane detection information on the lanes, (II) (i) a process of profiling the object detection information to thereby generate each piece of object profiling information corresponding to each of the objects and a process of profiling the lane detection information to thereby generate each piece of lane profiling information corresponding to each of the lanes, (ii) a process of inputting the object profiling information into an object based pitch estimation module to allow the object-based pitch estimation module to (ii-1) select a first target object among the objects by referring to the object profiling information and execute a first pitch estimation using a first height of the first target object, to thereby generate a first pitch and (ii-2) select a second target object among the objects by referring to the object profiling information and execute a second pitch estimation using a width of the second target object, to thereby generate a second pitch, and (iii) a process of inputting vanishing point detection information and the lane profiling information into a lane-based pitch estimation module, wherein the vanishing point detection information is generated by a VP (vanishing point) estimation network capable of analyzing the driving image and thus detecting at least one vanishing point, to thereby allow the lane-based pitch estimation module to (iii-1) execute a third pitch estimation using the lane profiling information and thus generate a third pitch and (iii-2) execute a fourth pitch estimation using the vanishing point detection information and thus generate a fourth pitch, and (III) a process of inputting the first pitch to the fourth pitch into a pitch-deciding module, to thereby allow the pitch-deciding module to apply ensemble operation to the first pitch to the fourth pitch and thus to generate a decided pitch corresponding to the driving image;

wherein the processor further performs: (IV) a process of calculating one or more pitch losses by referring to the decided pitch and the fourth pitch and a process of on-vehicle continual learning of the VP estimation network by using the pitch losses; and wherein the processor performs or supports another device to perform (i) during the driving operation of the specific vehicle, a process of fast-adapting by instance-wise incremental learning of the VP estimation network using the pitch losses, (ii) a process of transmitting the sampled data, used during the instance-wise incremental learning, to a learning server, to thereby allow the learning server to (ii-1) execute server-side continual learning of a reference VP estimation network, corresponding to the VP estimation network, by using the sampled data and (ii-2) transmit one or more parameters, updated through the server-side continual learning, to the calibration device, and (iii) after completion of the driving operation of the specific vehicle, a process of updating the VP estimation network by using the parameters received from the learning server.

15. A calibration device for calibrating at least one pitch of at least one camera on a specific vehicle, comprising:

at least one memory that stores instructions; and at least one processor configured to execute the instructions to perform or support another device to perform: (I) if at least one driving image is acquired from the camera during driving operation of the specific vehicle, a process of inputting the driving image respectively into an object detection network and a lane detection network, to thereby allow (i) the object detection network to detect one or more objects on the driving image and thus to generate object detection information on the objects, and (ii) the lane detection network to detect one or more lanes on the driving image and thus to generate lane detection information on the lanes, (II) (i) a process of profiling the object detection information to thereby generate each piece of object profiling information corresponding to each of the objects and a process of profiling the lane detection information to thereby generate each piece of lane profiling information corresponding to each of the lanes, (ii) a process of inputting the object profiling information into an object based pitch estimation module to allow the object-based pitch estimation module to (ii-1) select a first target object among the objects by referring to the object profiling information and execute a first pitch estimation using a first height of the first target object, to thereby generate a first pitch and (ii-2) select a second target object among the objects by referring to the object profiling information and execute a second pitch estimation using a width of the second target object, to thereby generate a second pitch, and (iii) a process of inputting vanishing point detection information and the lane profiling information into a lane-based pitch estimation module, wherein the vanishing point detection information is generated by a VP (vanishing point) estimation network capable of analyzing the driving image and thus detecting at least one vanishing point, to thereby allow the lane-based pitch estimation module to (iii-1) execute a third pitch estimation using the lane profiling information and thus generate a third pitch and (iii-2) execute a fourth pitch estimation using the vanishing point detection information and thus generate a fourth pitch, and (III) a process of inputting the first pitch to the fourth pitch into a pitch-deciding module, to thereby allow the pitch-deciding module to apply ensemble operation to the first pitch to the fourth pitch and thus to generate a decided pitch corresponding to the driving image;

wherein the processor further performs: (IV) a process of calculating one or more pitch losses by referring to the decided pitch and the fourth pitch and a process of on-vehicle continual learning of the VP estimation network by using the pitch losses; and wherein the processor further performs: (V) (i) a process of transmitting a trained VP estimation network model, created by the on-vehicle continual learning, to a learning server, to thereby allow the learning server to (i-1) evaluate the trained VP estimation network model and at least one another trained VP estimation network model received from at least one another vehicle and thus (i-2) select a best VP estimation network model and transmit the best VP estimation network model to the calibration device and (ii) a process of updating the VP estimation network by using the best VP estimation network model received from the learning server.

16. A calibration device for calibrating at least one pitch of at least one camera on a specific vehicle, comprising:

at least one memory that stores instructions; and at least one processor configured to execute the instructions to perform or support another device to perform: (I) if at least one driving image is acquired from the camera during driving operation of the specific vehicle, a process of inputting the driving image respectively into an object detection network and a lane detection network, to thereby allow (i) the object detection network to detect one or more objects on the driving image and thus to generate object detection information on the objects, and (ii) the lane detection network to detect one or more lanes on the driving image and thus to generate lane detection information on the lanes, (II) (i) a process of profiling the object detection information to thereby generate each piece of object profiling information corresponding to each of the objects and a process of profiling the lane detection information to thereby generate each piece of lane profiling information corresponding to each of the lanes, (ii) a process of inputting the object profiling information into an object based pitch estimation module to allow the object-based pitch estimation module to (ii-1) select a first target object among the objects by referring to the object profiling information and execute a first pitch estimation using a first height of the first target object, to thereby generate a first pitch and (ii-2) select a second target object among the objects by referring to the object profiling information and execute a second pitch estimation using a width of the second target object, to thereby generate a second pitch, and (iii) a process of inputting vanishing point detection information and the lane profiling information into a lane-based pitch estimation module, wherein the vanishing point detection information is generated by a VP (vanishing point) estimation network capable of analyzing the driving image and thus detecting at least one vanishing point, to thereby allow the lane-based pitch estimation module to (iii-1) execute a third pitch estimation using the lane profiling information and thus generate a third pitch and (iii-2) execute a fourth pitch estimation using the vanishing point detection information and thus generate a fourth pitch, and (III) a process of inputting the first pitch to the fourth pitch into a pitch-deciding module, to thereby allow the pitch-deciding module to apply ensemble operation to the first pitch to the fourth pitch and thus to generate a decided pitch corresponding to the driving image;

wherein, at the process of (II), the processor performs or supports another device to perform a process of instructing the object-based pitch estimation module to (i) select a second specific object, whose lateral distance is smallest, as the first target object, wherein the second specific object is selected among second candidate objects (1) whose lateral distances from the specific vehicle are equal to or less than a second distance threshold, (2) whose bounding boxes are not truncated, (3) whose object classes are a vehicle class, and (4) which are not occluded, by referring to the object profiling information, (ii) acquire an average height of the first target object by referring to detection history of the first target object, and (iii) (iii-1) if the average height is equal to or greater than a minimum height threshold and equal to or less than a maximum height threshold, then determine the average height as the first height and (iii-2) if the average height is less than the minimum height threshold or greater than the maximum height threshold, then determine an average of the minimum height threshold and the maximum height threshold as the first height.

17. A calibration device for calibrating at least one pitch of at least one camera on a specific vehicle, comprising:

at least one memory that stores instructions; and at least one processor configured to execute the instructions to perform or support another device to perform: (I) if at least one driving image is acquired from the camera during driving operation of the specific vehicle, a process of inputting the driving image respectively into an object detection network and a lane detection network, to thereby allow (i) the object detection network to detect one or more objects on the driving image and thus to generate object detection information on the objects, and (ii) the lane detection network to detect one or more lanes on the driving image and thus to generate lane detection information on the lanes, (II) (i) a process of profiling the object detection information to thereby generate each piece of object profiling information corresponding to each of the objects and a process of profiling the lane detection information to thereby generate each piece of lane profiling information corresponding to each of the lanes, (ii) a process of inputting the object profiling information into an object based pitch estimation module to allow the object-based pitch estimation module to (ii-1) select a first target object among the objects by referring to the object profiling information and execute a first pitch estimation using a first height of the first target object, to thereby generate a first pitch and (ii-2) select a second target object among the objects by referring to the object profiling information and execute a second pitch estimation using a width of the second target object, to thereby generate a second pitch, and (iii) a process of inputting vanishing point detection information and the lane profiling information into a lane-based pitch estimation module, wherein the vanishing point detection information is generated by a VP (vanishing point) estimation network capable of analyzing the driving image and thus detecting at least one vanishing point, to thereby allow the lane-based pitch estimation module to (iii-1) execute a third pitch estimation using the lane profiling information and thus generate a third pitch and (iii-2) execute a fourth pitch estimation using the vanishing point detection information and thus generate a fourth pitch, and (III) a process of inputting the first pitch to the fourth pitch into a pitch-deciding module, to thereby allow the pitch-deciding module to apply ensemble operation to the first pitch to the fourth pitch and thus to generate a decided pitch corresponding to the driving image;

wherein, at the process of (II), the processor performs or supports another device to perform a process of instructing the object-based pitch estimation module to select a third specific object, whose lateral distance is smallest, as the second target object, wherein the third specific object is selected among third candidate objects (1) whose lateral distances from the specific vehicle are equal to or less than a third distance threshold, (2) whose bounding boxes are not truncated, (3) whose object classes are a vehicle class, (4) which are not occluded, (5) whose differences between 2D bounding boxes and 3D bounding boxes among the bounding boxes thereof are equal to or less than a box difference threshold, and (6) whose aspect ratios of the bounding boxes thereof are equal to or greater than a ratio threshold, by referring to the object profiling information.

18. The calibration device of claim 10, wherein, at the process of (II), the processor performs or supports another device to perform a process of allowing the lane-based estimation module to (i) select a first lane and a second lane, (1) whose lengths are equal to or greater than a length threshold, (2) which are straight, and (3) which are parallel to each other on a coordinate system of the specific vehicle, by referring to the lane profiling information, (ii) detect a target vanishing point by using the first lane and the second lane, and (iii) execute the third pitch estimation by using the target vanishing point.

* * * * *